US010867430B2

(12) United States Patent
Lucas et al.

(10) Patent No.: US 10,867,430 B2
(45) Date of Patent: Dec. 15, 2020

(54) METHOD AND SYSTEM OF 3D RECONSTRUCTION WITH VOLUME-BASED FILTERING FOR IMAGE PROCESSING

(71) Applicant: Intel Corporation, Santa Clara, CA (US)

(72) Inventors: Blake Lucas, San Francisco, CA (US); Rita Brugarolas Brufau, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 46 days.

(21) Appl. No.: 16/194,959

(22) Filed: Nov. 19, 2018

(65) Prior Publication Data

US 2019/0088004 A1 Mar. 21, 2019

(51) Int. Cl.
| | |
|---|---|
| *G06T 15/08* | (2011.01) |
| *G06T 7/593* | (2017.01) |
| *G06T 15/20* | (2011.01) |
| *G06K 9/62* | (2006.01) |
| *G06T 19/20* | (2011.01) |
| *G06T 15/06* | (2011.01) |
| *G06T 7/194* | (2017.01) |
| *G06K 9/00* | (2006.01) |
| *G06T 17/00* | (2006.01) |

(52) U.S. Cl.
CPC .......... *G06T 15/08* (2013.01); *G06K 9/00664* (2013.01); *G06K 9/6202* (2013.01); *G06T 7/194* (2017.01); *G06T 7/593* (2017.01); *G06T 15/06* (2013.01); *G06T 15/205* (2013.01); *G06T 17/00* (2013.01); *G06T 19/20* (2013.01); *G06T 2207/10012* (2013.01); *G06T 2207/10028* (2013.01); *G06T 2207/20024* (2013.01); *G06T 2207/20084* (2013.01); *G06T 2207/20224* (2013.01); *G06T 2210/56* (2013.01)

(58) Field of Classification Search
CPC ....... G06T 7/194; G06T 7/593; G06T 15/205; G06T 17/00; G06T 19/20; G06T 2207/10012; G06T 2207/10028; G06T 2207/20024; G06T 2207/20084; G06T 2207/20224; G06T 2210/56; G06T 15/08; G06T 2207/10024; G06T 15/06; G06K 9/6202

See application file for complete search history.

(56) References Cited

U.S. PATENT DOCUMENTS

2018/0096463 A1* 4/2018 Kim .................. G06T 17/00
2018/0315232 A1* 11/2018 Jones ................ G06T 15/005

OTHER PUBLICATIONS

Kutulakos, Kiriakos N., and Steven M. Seitz. "A theory of shape by space carving." International journal of computer vision 38.3 (2000): 199-218. (Year: 2000).*

Goesele, Michael, et al. "Multi-view stereo for community photo collections." 2007 IEEE 11th International Conference on Computer Vision. IEEE, 2007. (Year: 2007).*

(Continued)

*Primary Examiner* — Yu Chen

(74) *Attorney, Agent, or Firm* — Green, Howard & Mughal LLP.

(57) ABSTRACT

A system, article, and method of 3D reconstruction with volume-based filtering for image processing.

25 Claims, 20 Drawing Sheets

(56) References Cited

OTHER PUBLICATIONS

Photo consistency, https://en.wikipedia.org/wiki/Photo-consistency, Sep. 24, 2015 (Year: 2015).*

Furukawa, Yasutaka, et al. "Towards internet-scale multi-view stereo." 2010 IEEE computer society conference on computer vision and pattern recognition. IEEE, 2010. (Year: 2010).*

Collet, A. et al., "High-quality streamable free-viewpoint video", ACM Transactions on Graphics (TOG); vol. 34; No. 4; p. 69; 2015.

Dale, A.M. , "Cortical surface-based analysis: I. Segmentation and surface reconstruction", Neuroimage 9.2; pp. 179-194; 1994.

Furukawa, Y. et al., "Accurate, dense, and robust multiview stereopsis", IEEE Transactions on Pattern Analysis and Machine Intelligence; vol. 32; No. 8; pp. 1362-1376; 2010.

Goesele, M. et al., "Multi-view stereo for community photo collections", Proceedings of International Conference on Computer Vision (ICCV); Rio de Janeiro, Brazil; 2007.

Guillemaut, J.Y. et al., "A Bayesian framework for simultaneous matting and 3D reconstruction", 3-D Digital Imaging and Modeling; IEEE Sixth International Conference; pp. 167-176; 2007.

Gupta, L. et al., "A Gaussian-mixture-based image segmentation algorithm", Pattern Recognition; vol. 31.3; pp. 315-325; 1998.

He, et al., "Mask R-CNN", Detectron, Facebook AI Research (FAIR), https://github.com/facebookresearch/detectron, arXiv:1703:06870v3 (2018).

Hirschmuller, H. et al., "Evaluation of stereo matching costs on images with radiometric differences", IEEE Transactions on Pattern Analysis & Machine Intelligence; pp. 1582-1599; 2008.

Kutulakos, K.N. et al., "A theory of shape by space carving", International Journal of Computer Vision; vol. 38.3; pp. 199-218; 2000.

Lowe, D.G. , "Object recognition from local scale-invariant features", International Conference on Computer Vision, Corfu, Greece, pp. 1150-1157; 1999.

Matsuyama, T. et al., "Multi-camera systems for 3d video production", 3D Video and Its Applications; pp. 17-44; Springer, London; 2012.

Press, W.H. et al., "Section 10.2 Golden Section Search in One Dimension", Numerical Recipes: The Art of Scientific Computing (3rd Edition); New York; Cambridge University Press; ISBN 978-0-521-88068-8; pp. 397-402; 2007.

Rother, C. , "Grabcut: Interactive foreground extraction using iterated graph cuts", ACM Transactions on Graphics (TOG); vol. 23; No. 3; 2004.

Schneider, D. , "Visual Hull", retrieved online at www.homepages.inf.ed.ac.uk.

Shi, J. et al., "Good features to track", Cornell University; 1993.

Tola, E. et al., "Daisy: An efficient dense descriptor applied to wide-baseline stereo", IEEE Transactions on Pattern Analysis and Machine Intelligence; vol. 32.5; pp. 815-830; 2010.

Toyoura, M. et al., "Silhouette extraction with random pattern backgrounds for the volume intersection method", 3-D Digital Imaging and Modeling; IEEE Sixth International Conference; pp. 225-232; 2007.

Zabih, R. et al., "Non-parametric local transforms for computing visual correspondence", European Conference on Computer Vision; Springer, Berlin, Heidelberg; pp. 151-158; 1994.

* cited by examiner

```
┌─────────────────────────────────────────────────┐
│ OBTAIN IMAGE DATA FROM AT LEAST ONE CAMERA AND OF│
│  MULTIPLE IMAGES OF DIFFERENT PERSPECTIVES OF THE│
│              SAME SCENE 302                      │
└─────────────────────────────────────────────────┘
                         ↓
┌─────────────────────────────────────────────────┐
│     FORM A POINT CLOUD USING THE IMAGE DATA OF   │
│            THE MULTIPLE IMAGES 304               │
└─────────────────────────────────────────────────┘
                         ↓
┌ ─ ─ ─ ─ ─ ─ ─ ─ ─ ─ ─ ─ ─ ─ ─ ─ ─ ─ ─ ─ ─ ─ ─ ┐
│ FORM AN EXPANDED POINT CLOUD COMPRISING PERFORMING│
│  EXPANSION ITERATIONS EACH COMPRISING USING AT LEAST│
│    ONE DEPTH ESTIMATE OF A POINT ON THE INITIAL POINT│
│   CLOUD TO DETERMINE THE DEPTH ESTIAMTE OF ONE OR │
│    MORE OTHER POINTS OF AT LEAST ONE THE IMAGES 306│
│   ┌ ─ ─ ─ ─ ─ ─ ─ ─ ─ ─ ─ ─ ─ ─ ─ ─ ─ ─ ─ ─ ┐  │
│   │ WHEREIN INDIVIDUAL EXPANSION ITERATIONS ARE│  │
│   │ PERFORMED AT DIFFERENT RESOLUTIONS OF THE │  │
│   │              SAME IMAGES 308              │  │
│   └ ─ ─ ─ ─ ─ ─ ─ ─ ─ ─ ─ ─ ─ ─ ─ ─ ─ ─ ─ ─ ┘  │
└ ─ ─ ─ ─ ─ ─ ─ ─ ─ ─ ─ ─ ─ ─ ─ ─ ─ ─ ─ ─ ─ ─ ─ ┘
                         ↓
┌─────────────────────────────────────────────────┐
│     FILTER, BY AT LEAST ONE PROCESSOR, LOCAL POINT│
│       VOLUMES COMPRISING REMOVING THE LOCAL POINT │
│  VOLUMES, VOLUME BY VOLUME, FROM THE POINT CLOUD THAT│
│   DO NOT HAVE MATCHING IMAGE DATA ON AT LEAST TWO OF│
│                THE MULTIPLE IMAGES 310            │
│   ┌ ─ ─ ─ ─ ─ ─ ─ ─ ─ ─ ─ ─ ─ ─ ─ ─ ─ ─ ─ ─ ┐  │
│   │  PERFORM THE FILTERING AS MULTIPLE FILTER │  │
│   │ ITERATIONS AFTER EXPANSION AT AN INDIVIDUAL│  │
│   │   EXPANSION ITERATION, AND REPEATED FOR   │  │
│   │      MULTIPLE EXPANSION ITERATIONS 312    │  │
│   └ ─ ─ ─ ─ ─ ─ ─ ─ ─ ─ ─ ─ ─ ─ ─ ─ ─ ─ ─ ─ ┘  │
│   ┌─────────────────────────────────────────┐    │
│   │   WHEREIN INDIVIDUAL LOCAL POINT VOLUMES ARE│ │
│   │    FORMED OF AT LEAST ONE PARTICLE ON THE POINT│
│   │  CLOUD DEFINING A VOLUME HAVING FIXED REAL WORLD│
│   │ DIMENSIONS RELATIVE TO AT LEAST ONE OBJECT IN THE│
│   │  MULTIPLE IMAGES AND THAT REMAINS FIXED FROM IMAGE│
│   │     TO IMAGE OF DIFFERENT PERSPECTIVES 314  │  │
│   └─────────────────────────────────────────┘    │
└─────────────────────────────────────────────────┘
                         ↓
┌─────────────────────────────────────────────────┐
│     PROVIDE AN EXPANDED AND FILTERED POINT       │
│    CLOUD TO BE USED TO GENERATE IMAGES 316       │
└─────────────────────────────────────────────────┘
```

FIG. 4D 

- FOR EACH IMAGE OF DIFFERENT PERSPECTIVE, EXPAND DEPTH ESTIMATES TO PIXEL LOCATIONS 464
  - SET PIVOT PIXEL 466
  - DETERMINE IF NEIGHBOR PIXELS HAVE DEPTH EST. 468
  - USE BRACKETED LINE SEARCH TO FILL DEPTH ESTIMATE 470
    - USE CENSUS PIXEL SCORE 472
  - DISCARD OCCLUDED POINTS 474

- SET FILTER ITERATION n = 0 476

- CONSTRUCT POINT CLOUD WITH LOCAL POINT VOLUMES (LPVs) OF PREDETERMINED FIXED REAL WORLD SIZE RELATIVE TO AT LEAST ONE OBJECT IN THE MULTIPLE IMAGES 478

- REMOVE LPVs FROM POINT CLOUD THAT DO NOT MATCH IMAGES IN TWO OR MORE VIEWS 480
  - COMPARE LPV TO CORRESPONDING POINTS IN 2D IMAGES 482

- n = Max N? 484
  - NO: SET n = n + 1 486
  - YES: LOWEST RESOLUTION COMPLETE? 488
    - NO: DOWN-SAMPLE IMAGES 490
    - YES: 

FIG. 15 ~1500
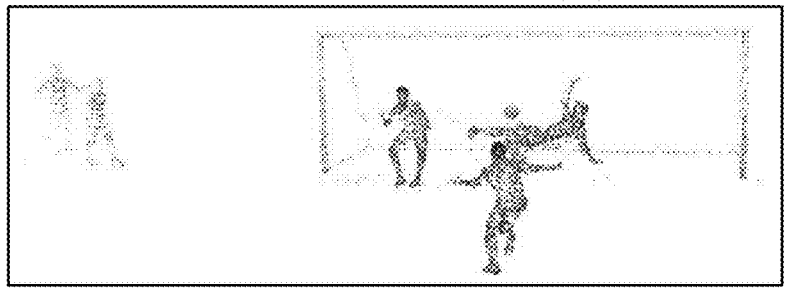
FIG. 16 ~1600
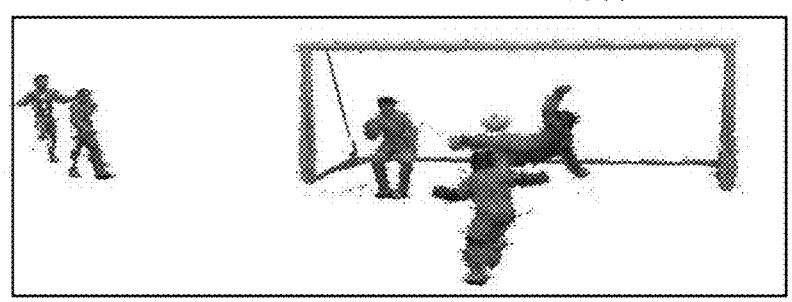
FIG. 17 ~1700
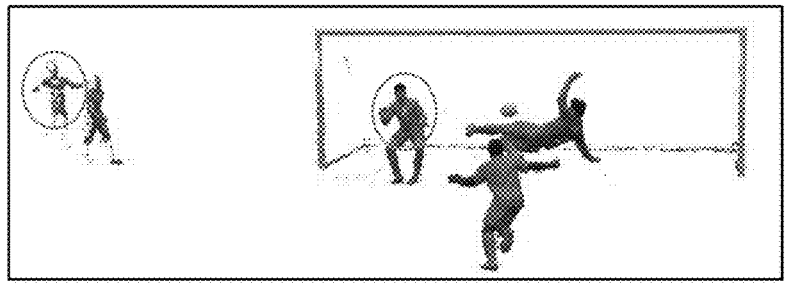
FIG. 18 ~1800
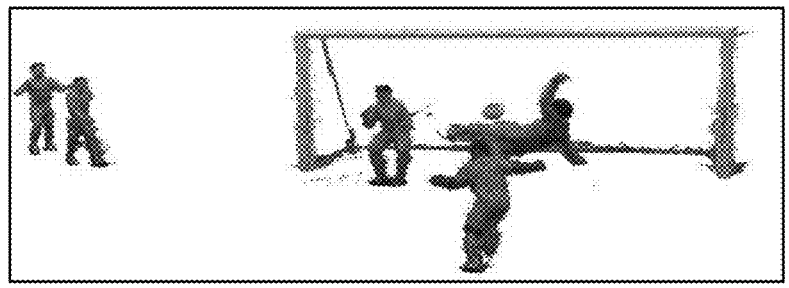
FIG. 19 ~1900
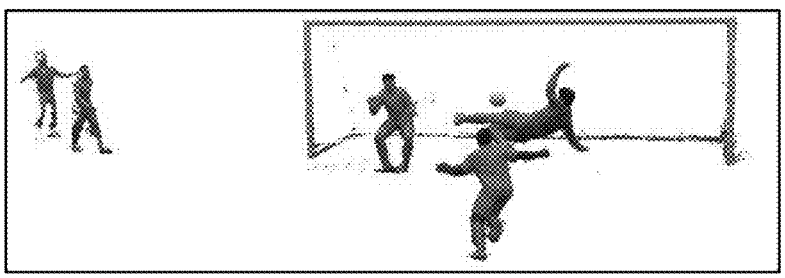

FIG. 22A ~2200
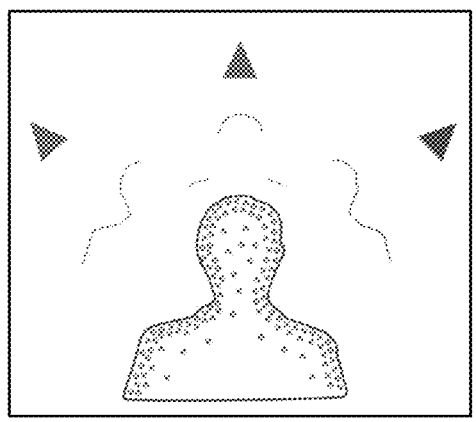
FIG. 22B ~2250
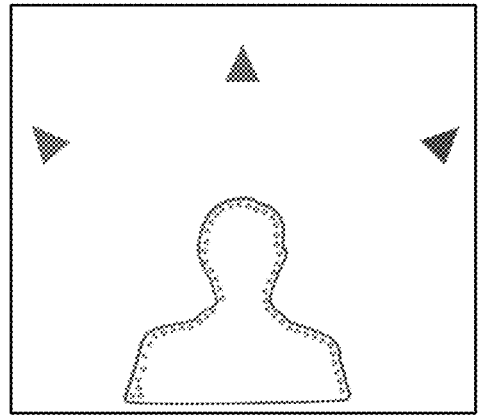
FIG. 23A ~2300
FIG. 23B ~2350

FIG. 25 — 2500
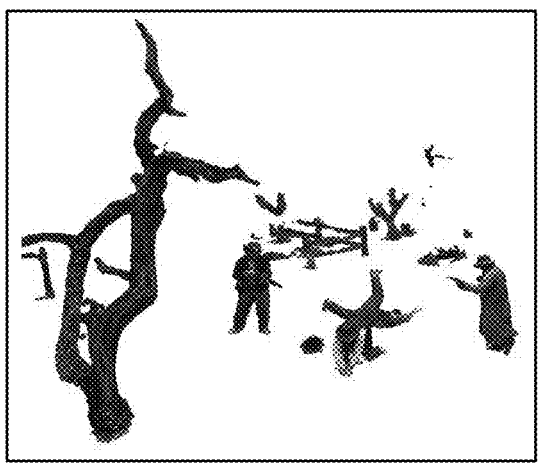
FIG. 26 — 2600
FIG. 27 — 2700
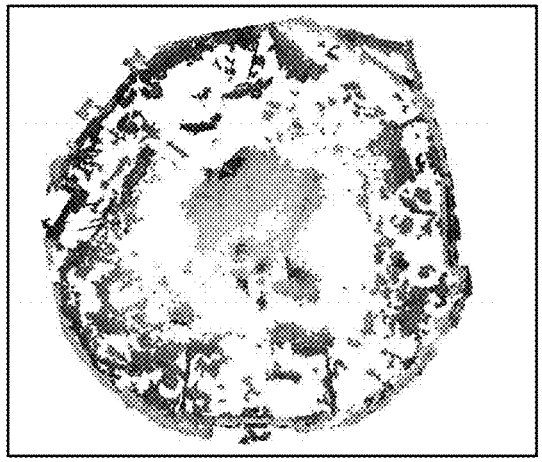
FIG. 28 — 2800
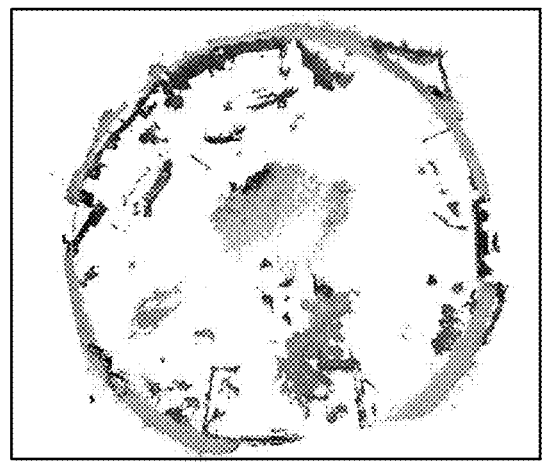

METHOD AND SYSTEM OF 3D RECONSTRUCTION WITH VOLUME-BASED FILTERING FOR IMAGE PROCESSING

BACKGROUND

Camera arrays may be provided to capture multiple images of the same scene except from different angles. Certain commercial setups may have very extensive arrays such as a dome with controlled lighting environments such as at an athletic event or at a professional video studio such as for movies or television. Often such arrays may be able to capture all sides of an object in the scene. These images can then be used to generate depth maps, and in turn, point clouds that may be used to form 3D geometric or semantic models that accurately locate objects in a 3D space of the scene. This 3D reconstruction is performed so that objects in the scene may be used for computer vision, artificial intelligence, object recognition, head mounted 3D displays (HMDs) or point of view displays, and otherwise whenever it is desirable to know the shape, position, or identity of an object in a scene, and/or to view the objects from a desired angle different from one of the camera angles.

These professional imaging scenarios permit fine control of camera pose, field of view, lighting conditions, captured background, and so forth. However, these cameras arrays often have large camera-to-subject distances and wide baselines between cameras. This makes it difficult to accurately reconstruct objects with existing techniques when overlap between images from different cameras are at relatively large angles, causing large perspective distortions and more occluded areas. A number of 3D reconstruction techniques are used to compensate for this, but often create artifacts and/or leave holes, which require a very significant amount of manual image editing that is time consuming and costly.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart of a method of 3D reconstruction with volume-base filtering for image processing in accordance with at least one of the implementations disclosed herein;

FIGS. 4A-4F is a detailed flow chart of a method of 3D reconstruction volume-base filtering for image processing in accordance with at least one of the implementations disclosed herein;

FIG. 15 is an image demonstrating results of initial reconstruction seeds in accordance with at least one of the implementations disclosed herein;

FIG. 16 is an image demonstrating results of a point cloud after a first expansion pass in accordance with at least one of the implementations disclosed herein;

FIG. 17 is an image demonstrating results of a point cloud after a first filter pass in accordance with at least one of the implementations disclosed herein;

FIG. 18 is an image demonstrating results of a point cloud after a second expansion pass in accordance with at least one of the implementations disclosed herein;

FIG. 19 is an image demonstrating results of a point cloud after a second filter pass in accordance with at least one of the implementations disclosed herein;

FIG. 22A is a schematic diagram showing depth maps and an initial point cloud in accordance with at least one of the implementations disclosed herein;

FIG. 22B is a schematic diagram demonstrating a visual hull of fused depth maps in accordance with at least one of the implementations disclosed herein;

FIG. 23A is an image demonstrating a point cloud before post processing in accordance with at least one of the implementations disclosed herein;

FIG. 23B is an image to demonstrate a point cloud after post processing in accordance with at least one of the implementations disclosed herein;

FIG. 25 is another resulting image from a point cloud generated in accordance with at least one of the implementations disclosed herein;

FIG. 26 is an another resulting image from a point cloud generated in accordance with at least one of the implementations disclosed herein;

FIG. 27 is a resulting image of a top view of a scene and from a point cloud generated in accordance with at least one of the implementations disclosed herein;

FIG. 28 is a resulting image of the top view of a scene and from a point cloud generated by a conventional technique;

DETAILED DESCRIPTION

Figure 1:
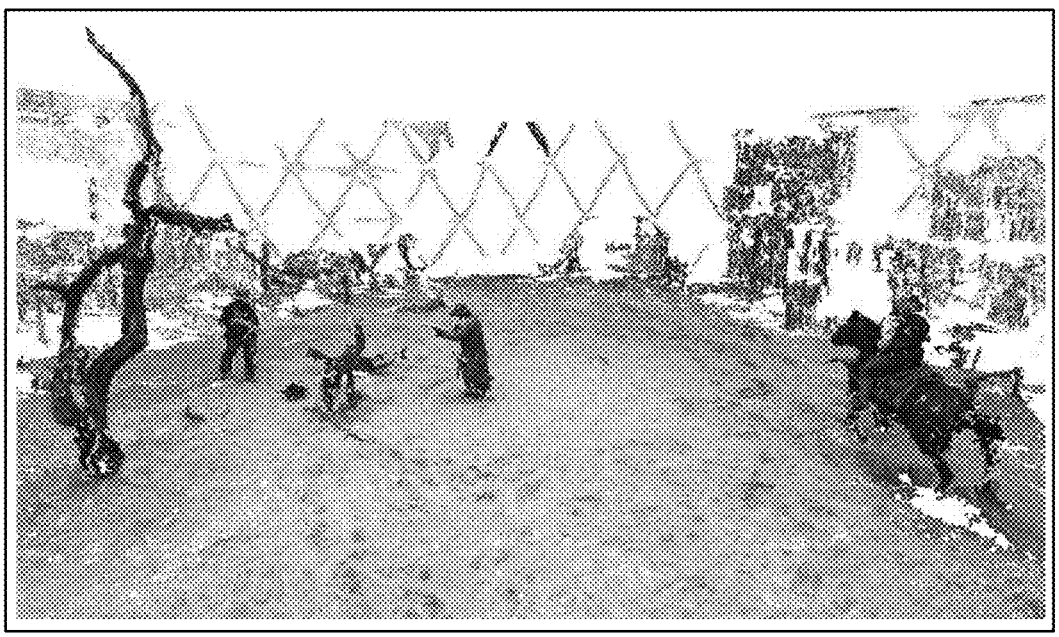
FIG. 1 is an image indicating 3D reconstruction results generated by using a conventional stereo technique.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or professional or consumer electronic (CE) devices such as imaging devices, digital cameras, smart phones, webcams, video game panels or consoles, set top boxes, tablets, wearables such as HMDs, robots, and so forth, may implement the techniques and/or arrangements described herein including in the form of camera arrays. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of 3D reconstruction with volume-based filtering for image processing.

As mentioned, a number of difficulties arise when performing 3D reconstruction of scenes captured by multiple cameras with wide baselines and relatively large camera to subject distances even though such a camera array may be placed in a carefully controlled lighting environment, such as around a capture dome, stage, or studio, or even at stadiums or arenas. Often, it is difficult to use stereo matching between cameras to extract 3D depth when the baseline (distance between cameras) is a meter or more because object features appear differently in images taken at significantly different positions. Tailored techniques for matching features over large camera baselines suffer from inaccuracy and artifacts due to perspective distortions and occlusion differences.

Space carving methods are popular for 3D reconstruction from images captured in capture domes. See Kutulakos, K. N., et al., "A theory of shape by space carving", International journal of computer vision, Vol. 38.3, pp. 199-218 (200)); Toyoura, M, et al., "Silhouette extraction with random pattern backgrounds for the volume intersection method", 3-D Digital Imaging and Modeling. Sixth international Conference, IEEE, pp. 225-232 (2007); and Guillemaut, J. Y., et al., "A Bayesian framework for simultaneous matting and 3d reconstruction", 3-D Digital Imaging and Modeling, Sixth International Conference, IEEE pp. 167-176 (2007). Space carving methods determine the shape of a visual hull by starting with an initial volume and carving away space on the volume until it converges to a photo or visual hull. A visual hull is the 3D shape of an object or objects in the captured images defined by outer boundary or silhouette of object(s) from each camera into 3D space. By one form, the space carving is performed on a voxel-level. The space carving is desirable because the space carving methods can infer shapes of occluded surfaces and surfaces with no or little observable texture.

The space carving methods, however, usually require very accurate 2D segmentation masks that are hard to produce with automated techniques (e.g. graph cuts, motion segmentation, convolutional neural networks (CNNs), Gaussian mixture models (GMMs), and so forth). Thus, the space-carving methods produce artifacts in the presence of imperfect segmentation masks. Also, the space carving algorithms do not naturally enforce re-projections of the original images onto a 3D model that is necessarily in photometrically consistent; or in other words, in alignment with stereo 3D reconstruction methods that match image features from different camera perspectives to form a 3D point cloud.

Accordingly, an alternative popular 3D reconstruction method is a photometric stereo method. See Furukawa, Y., et al., "Accurate, dense, and robust multiview stereopsis", IEEE transactions on pattern analysis and machine intelligence, Volume 32(8), pp. 1362-1376 (2010); and Goesele, M., et al., "Multi-view stereo for community photo collections", Proceedings of International Conference on Computer Vision (ICCV), Rio de Janeiro, Brazil, (2007). Stereo methods match features or points from different images of different perspectives. These points are then used to form a single 3D point cloud representing a 3D space of all of the images from the different perspectives and that have the objects in the images in 3D. For consistency and clarity, herein, a collection of points or pixel locations from a single image that are assigned depth values is referred to herein as a depth map of a single image, while a 3D object formed by combining multiple images from different perspectives is represented as a point cloud comprised of an unstructured collection of points with associated colors and normal directions.

Figure 2:
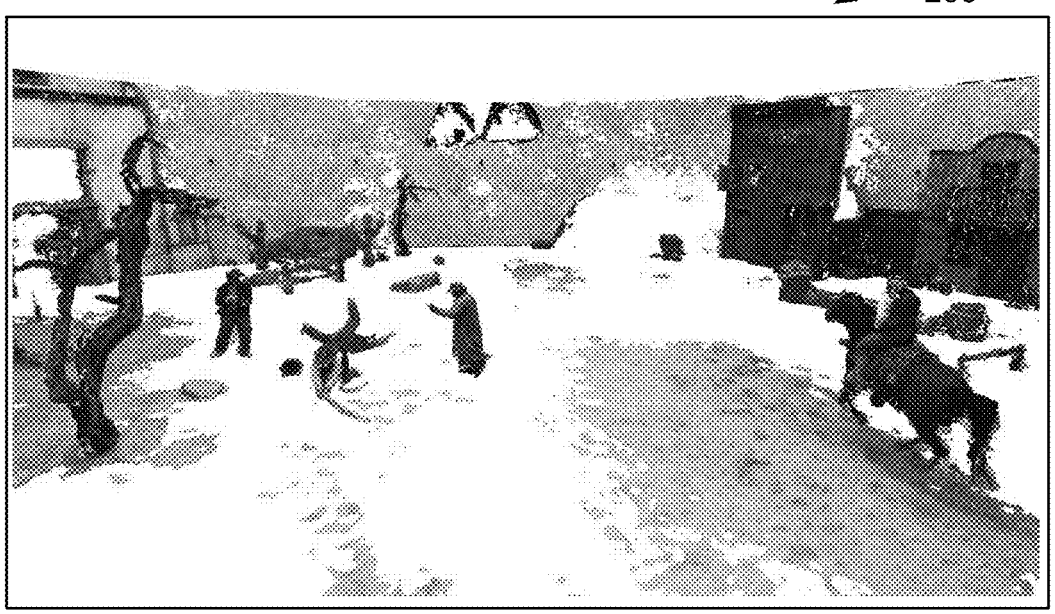
FIG. 2 is another image indicating 3D reconstruction results generated by using a conventional stereo technique.
Figure 4A:
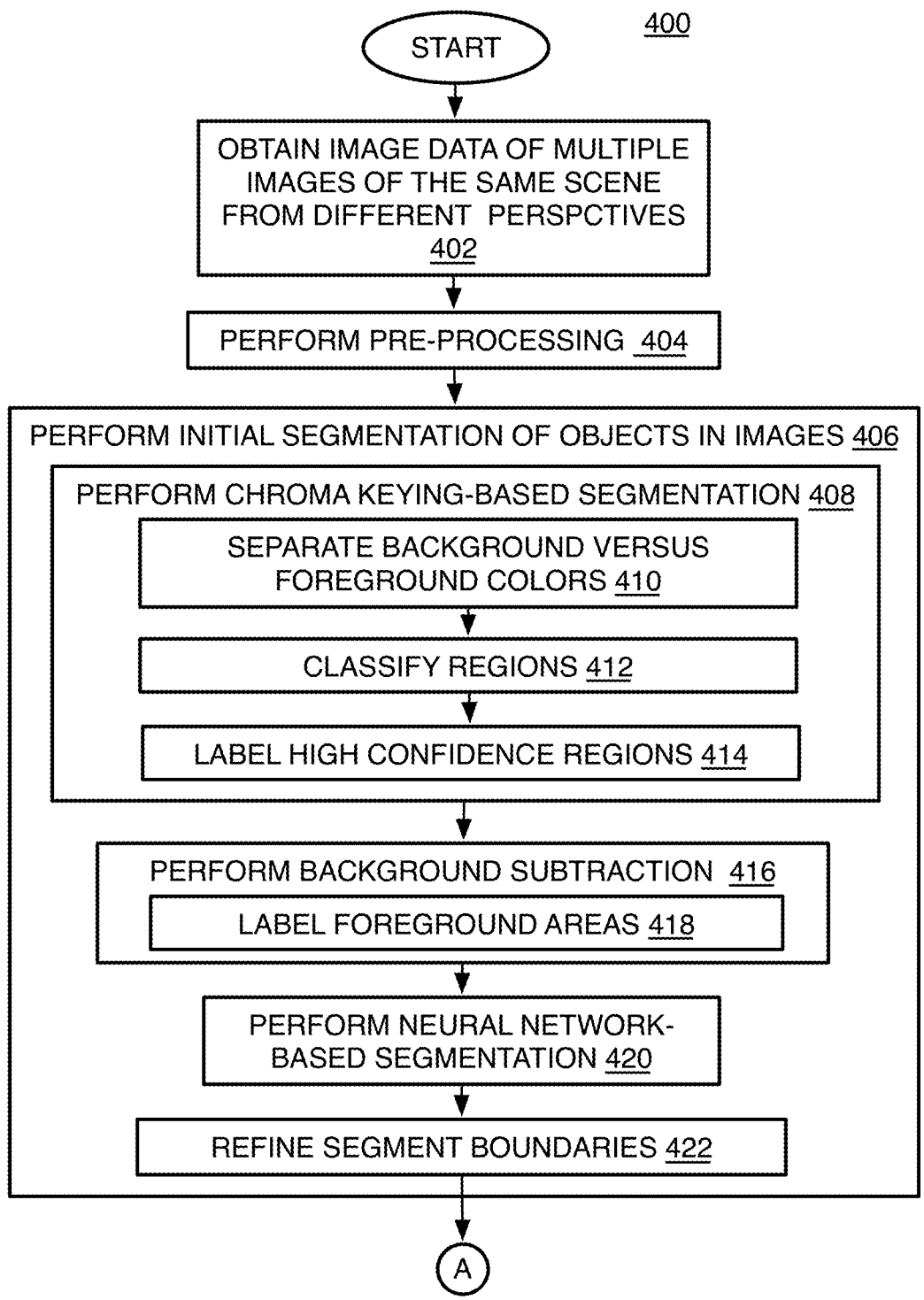
Figure 4B:
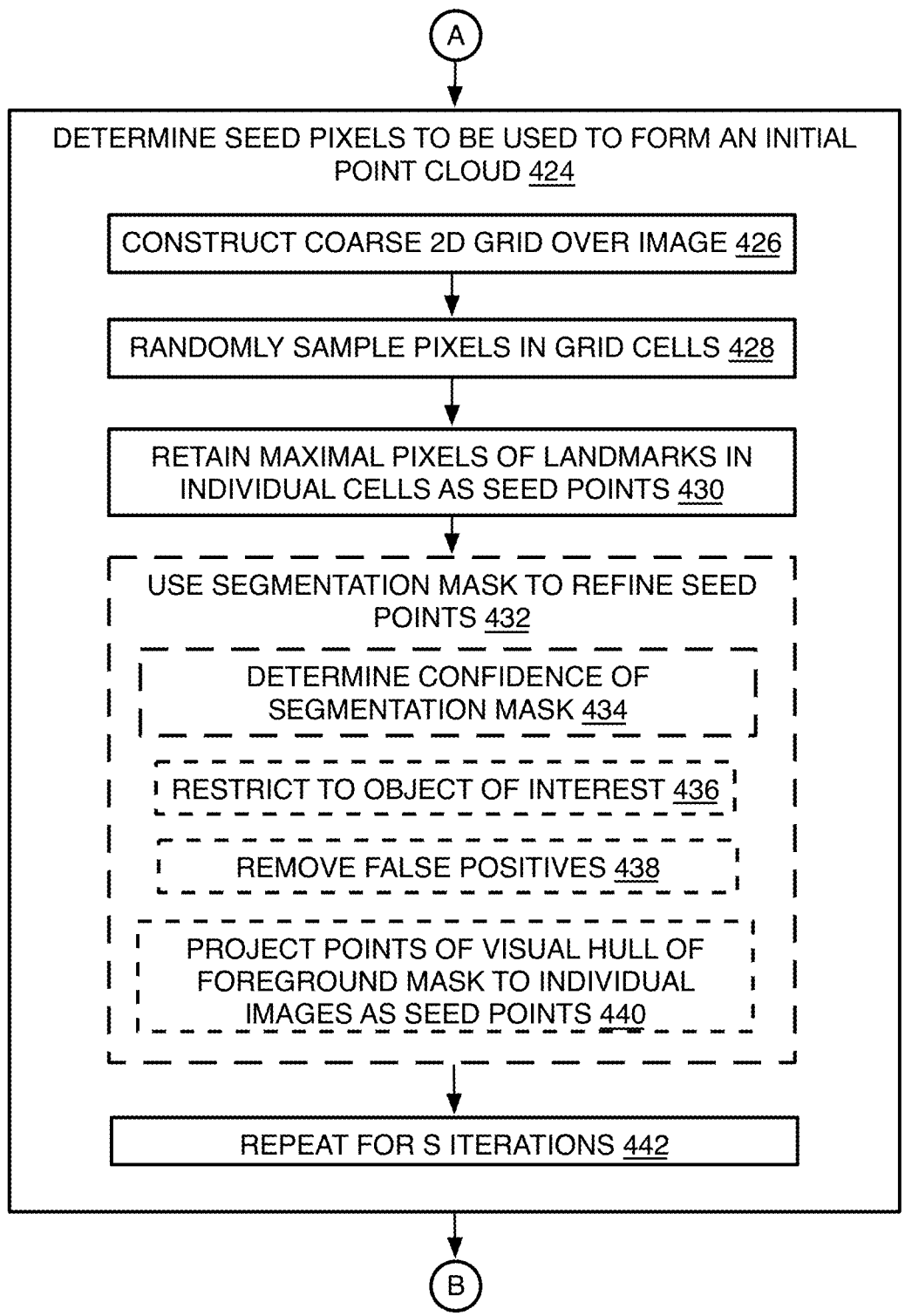
Figure 4C:
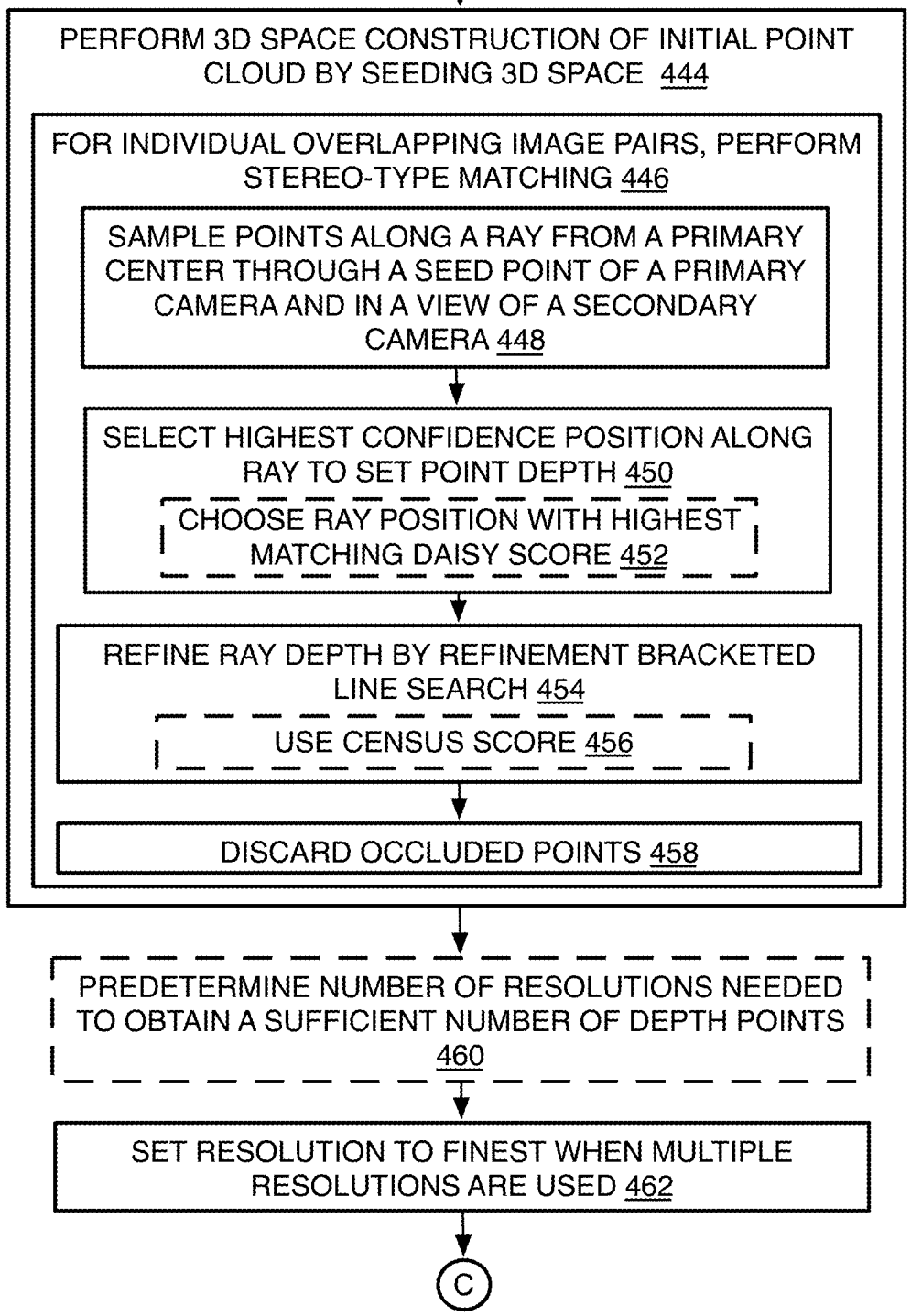
Figure 4E:
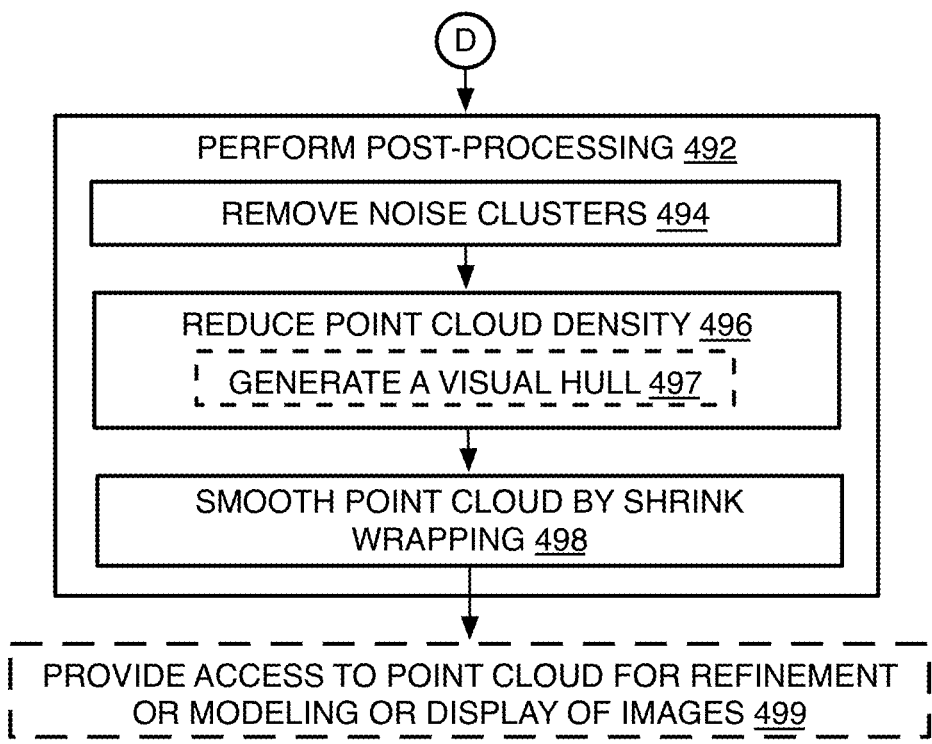
Figure 4F:
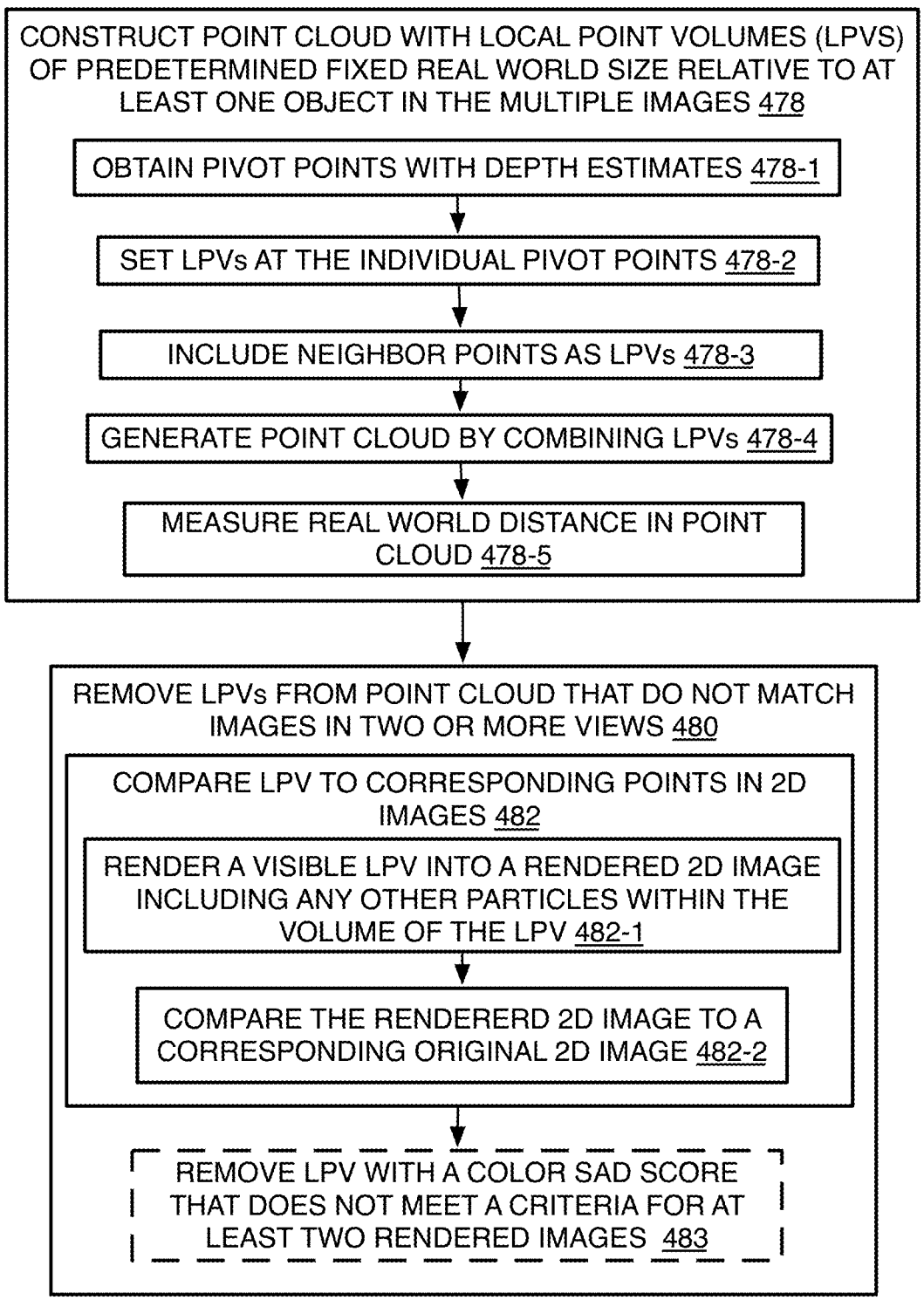

Referring to FIGS. 1-2, stereo methods perform well on scenes with highly textured surfaces even though segmentation masks are not necessarily highly accurate. For instance, one stereo technique uses a patch to determine if points on one image match points on another image rather than the more conventional scanline matching. The patches are better for capturing similar pixel data on images of two different perspectives. This patch-based multiview stereo (PMVS) technique, however, tends to skip over fine structures in the scene and overshoot object boundaries because the stereo techniques were typically designed for outdoor scenes consisting of buildings with large flat textured surfaces. The stereo methods also suffer from holes in regions with little texture or occluded regions not seen by a sufficient number of camera views. An image 100 (FIG. 1) of a scene referred to herein as the "cowboy scene", and formed by using PMVS shows noise around object boundaries and the holes in the objects such as here a horse, tree, man's foot, and so forth. An image 200 (FIG. 2) shows an improved PMVS technique and is used with commercial software such as Agisoft, but has a bias towards large planar surfaces and tends to miss thin features (notice a gun barrel missing at a man's hand).

Thus, space carving methods combined with the stereo methods can provide very good quality 3D reconstruction since each technique compensates for the other technique. One such attempt at the combination is a free-viewpoint reconstruction system that combines the two approaches by first using a PMVS technique to generate a point cloud, and then constraining the reconstructed surface to be within a visual (space-carved) hull. See Collet, A., et al., "High-quality streamable free-viewpoint video", ACM Transactions on Graphics (TOG), Volume 34(4), p. 69 (2015), This free-viewpoint technique still fails, however, because it projects the relatively noisy stereo solution onto a visual hull that has its own set of errors and artifacts, thereby compounding the errors and visible inaccuracies.

To resolve these issues, the present system and method of 3D reconstruction tightly integrates the two approaches to address the reality of having imperfect segmentation masks for content with little or no texture (for example, people wearing solid color clothes). Thus, the present method combines stereo and space-carving-type techniques in a way that provides a solution that is consistent with both techniques while reducing or eliminating the disadvantages of the two techniques. Particularly, the method can result in the use of the stereo methods in highly textured regions and space-carving-type methods in occluded regions or regions with little texture.

This is accomplished by first performing a rigorous yet computationally efficient initial segmentation process that provides good quality initial segmentation masks. Such initial segmentation combines the results of chroma-key segmentation, background subtraction, and neural network object detection. The combined result is refined by a boundary segmentation method such as active contours or graph cut algorithm. Candidate pixel locations indicating landmarks from the segmentation are then tested to form an initial point cloud. A stereo technique is applied for this purpose using ray-tracing to extend a ray from a first camera center and point in the view or image of the first camera and into the view of a second camera with an overlapping image. Candidate depth estimates are formed along the rays in the view of the second camera. The process is repeated for every pair of cameras with overlapping fields of view. Stereo-matching confidence scores based on local region descriptors for image data (also referred to herein as representations) are then used to select the best depth estimate for the point being analyzed. By one form, this involves an initial selection by using a gradient histogram-type of local region descriptor such as a DAISY score, while the point is then refined using a non-parametric intensity-based confidence score, such as a CENSUS score. These confidence scores are described in detail below.

Then expansion iterations assign depth estimates, image by image, and to 2D pixel locations without a depth estimate yet, and by using the confidence scores, such as the CENSUS scores. By one form, each expansion iteration is performed at a different resolution in order to compensate for the relatively small support of the CENSUS pixel area that is being applied as explained below.

This approach minimizes the amount of work that has to be done by artists to clean up resulting point clouds for film and/or video production which may be at the expense of more computation time. The method is biased towards erring on the side of false positives instead of false negatives by having such a robust seeding and expansion of points image by image such that corresponding points on different images could each have its own candidate point in the point cloud resulting in some redundancy. This is ultimately more efficient because it is easier for artists to manually remove extraneous points (which is a relatively easier 2D task) than to complete missing structures by sculpting (which is a relatively more difficult 3D task).

Thereafter, filtering iterations are performed for each or individual expansion iterations. The filtering is performed by setting a local point volume (LPV) (i.e. 3D point) at each 2D sample location with an estimated depth determined by ray-casting, mentioned previously, that was the center pixel of a patch window used for computing a CENSUS score. The LPVs have fixed shapes and dimensions, such as spheres with a real world diameter or width of about 1 mm-2 cm, that do not change from one image to another image despite any changes in perspective and changes in distance from objects in the image to the camera that result in a change in the number of pixels that form an object in the image. Thus, the projected size of the LPV in pixels varies between camera perspectives. The expanded point cloud so far is then formed by aggregating the LPVs. The LPVs are then rendered into a rendered image in the perspective of each of the cameras, which are then compared to the original images. The rendering of an individual LPV includes at least one particle that defines the volume of the LPV and particles of other LPVs that are within the volume of the current LPV being analyzed. By one form, if the rendering of the LPV does not have matching image data (such as color or intensity) in two or more of the images from the multiple perspectives, then that LPV is removed from the latest point cloud. The removal of the LPV includes removing the at least one particle that defines the volume of the current LPV from the latest point cloud, and by one form, without removing any other LPV with defining particles within the volume of the current LPV.

The procedure for combining expansion and region culling is a powerful technique for removing noise and guiding photometric stereo techniques to solutions that are consistent with all observed perspectives. Thus, the initial seeding and expansion procedure insures small features are not missed in the reconstruction, and the culling procedure reduces spill of foreground regions into background regions.

Referring to FIG. 3, a process 300 is provided for a method of 3D reconstruction with volume-based filtering for image processing. In the illustrated implementation, process 300 may include one or more operations, functions, or actions 302 to 316 numbered evenly. By way of non-limiting example, process 300 may be described herein with reference to example image capture processing system 2900 of FIG. 29, and where relevant.

Process 300 may include "obtain image data from at least one camera and of multiple images of different perspectives of the same scene" 302. As mentioned above, such images may be obtained from controlled environments such as sports stadiums or arenas, or video filming studios for example. The multiple images also must be overlapping for the method to work, while the scenes being captured may be still (fixed) scenes or scenes with moving objects. Scenes with moving objects should have a set of video frames taken from multiple cameras of different views at the same time.

Then, the process 300 may include "form a point cloud using the image data of the multiple images" 304. By one approach, this point cloud may be generated in a number of different ways and then may be provided for filtering as described below. By one approach, however, the point cloud refers to an iteratively formed expanded point cloud that is filtered by the volume-based process described below. Thus, for the latter approach and before the filtering, a number of operations may be performed to generate 3D particles that may be used to form an initial point cloud. Specifically, in order to improve the results here, this approach preliminarily includes a very rigorous and precise initial object (or foreground-background) segmentation. As mentioned, this may involve a combination of techniques such as chroma-keying segmentation, background subtraction, and neural network object detection. The results of these are combined and then refined by a boundary refinement algorithm such as a graph cut (such as grabcut) technique resulting in a map of candidate pixel locations to be used to populate a point cloud.

This operation then may include seed selection to form a set of sample locations that correspond to the most salient feature points in the image using a Harris corner detector or Shi-Tomasi features. Alternatively or additionally, a segmentation mask found to be of high confidence may be used to generate a 3D visual hull for a targeted object, and those pixel locations not encompassed by 2D projections of the hull may be removed. These operations may be repeated for a number of iterations to select a sufficient number of seed locations in each image.

A stereo matching technique is then applied to perform depth estimation for seeds in the initial point cloud. Rays are traced from the camera center of a first view or image, through a seed point on the first image. Ray positions are projected onto the view of another overlapping second camera, or second view or image, to determine a linear range or bracket of potential depth estimates along the ray and within the second view or image. By one form, the process is repeated for all pairs of cameras with overlapping fields of view, although other alternatives could be used as mentioned below. Stereo-matching confidence scores are then used to select the best depth estimate for the seed point being analyzed. By one form, and as mentioned above, this involves an initial selection by using the DAISY score, while the depth estimate is then refined using the CENSUS score. Occluded points are then discarded. This results in the data that could be used to form an initial point cloud, where each included pixel location is provided with 2D pixel coordinates and a depth value. The confidence scores are described in detail below.

While the filtering could be applied to such initial point cloud data, by one form, however, the process is performed iteratively to improve results and by performing a number of expansion iterations, and then filtering each expanded result at an expansion iteration. Thus, process 300 then may include "form an expanded point cloud comprising performing expansion iterations each comprising using at least one depth estimate of a point on an initial point cloud to determine depth estimates of one or more other points of at least one of the images" 306. Particularly, this operation may include first expanding or growing an initial point cloud (or at least the points that could be used to form an initial point cloud when the initial point cloud is not actually generated) by providing depth estimates to points neighboring a pivot point that already has a depth estimate determined by the ray-casting process. By one form, neighboring points are the directly adjacent pixel locations to a current, center, or other key pixel (or pixel location), and by one example, is the adjacent upper, lower, left and right pixels relative to the pivot pixel. Many other variations are contemplated such as including the diagonal pixel locations and/or any other pattern that includes pixel locations within a certain range or distance from the pivot pixel. The expansion may be performed by analyzing each image in 2D, image by image, determining which points from the initial or latest point cloud have neighbor points that still need a depth estimate, and then analyzing those points. A bracket search is used again to assign a depth estimate near the pivot point to the neighbor point, and by one form, by determining the CENSUS score within the bracket. These neighbor points then become 3D particles that populate the latest expanded point cloud, and each such neighbor point then becomes its own LPV.

By one approach, this expansion operation may include "wherein individual expansion iterations are performed at different resolutions of the same images" 308. This improves the image data accuracies by permitting the CENSUS region, which is a fixed pixel area such as 7×7 pixels by one example, to cover more area of the total image and objects on the image at the lower or coarse resolutions. By one form, the expansion iterations proceed so that the finest resolution is used first, and the resolution is down-sampled for each iteration after the first iteration. Other orders could be used, such as coarsest to finest that may be faster, but not as accurate.

The process 300 may include "filter, by at least one processor, local point volumes comprising removing the volumes, volume by volume, from the point cloud that do not have matching image data on at least two of the multiple images" 310, and after expansion of the individual expansion iterations when the expansion iterations are being used. Thus, this operation may include "perform the filtering as multiple filter iterations after expansion at an individual expansion iteration, and repeated for multiple expansion iterations" 312. Specifically, after each expansion at each or individual expansion iterations, one or more filter iterations may be performed to remove or carve away erroneous local point volumes (LPVs) that do not belong on an object, similar to space carving except on a fixed real world volume basis rather than a pixel-based or voxel-based process, and at a much more photometric basis rather than merely carving away outer edges as in space carving.

The filtering is performed by first combining the LPVs to generate the latest expanded point cloud. To this end, this operation may include "wherein individual local point volumes are formed of at least one particle on the point cloud defining a volume having fixed real world dimensions relative to at least one object in the multiple images and that remains fixed from image to image of different perspectives" 314. By one form, the LPVs are centered at pivot points assigned to the depth estimates during the ray-casting so that the LPV is a 3D object that is defined by, around, or relative to a single 3D point or particle. The LPV may actually encompass multiple particles in a point cloud for example when the pivot point of adjacent or nearby LPVs are within the limits (or outer boundary) of the first LPV. By one form, the LPVs are spherical and have a diameter of about 1 mm to 2 cm and by another 1-2 cm, and in one example, are fixed at about 1 cm, although other sizes and shapes could be used. Thus, each LPV can overlap and enclose multiple points for the latest point cloud within its volumetric limit in three dimensions. By one example, the dimensions of the formed LPVs remain fixed throughout the process, for all iterations, and the dimensions remain fixed regardless of the distance from the camera to the scene for each image. Thus, it should be noted that the LPV is set by its shape and volume rather than the number of pixel locations within the LPV which may vary from camera perspective to camera perspective depending on the distance to the scene or objects captured, the resolution, and location in space of the object shown in the image. It also will be understood that the LPVs of the point cloud also are formed by the neighbor particles added during the expansion iterations when used.

The filtering itself is performed by rendering the LPV from the generated latest point cloud into a 2D rendered image. The rendering of the LPV includes its own defining particle(s) and any particles defining other LPVs within the volume of the LPV being rendered. The rendered image is then compared to each of the original multiple images of different perspectives input to the process. When there is no match of at least two images, then the LPV, and particularly the single particle or pivot point as a center defining the spherical boundary of the LPV in the present examples, is removed from the point cloud although the single LPV could have more than one defining particle that is removed. By one example, the match may be performed by determining when a normalized color difference (such as a sum of absolute difference (SAD) score) with respect to the original images meets a criteria, such as when it does or does not exceed a threshold in two or more views.

Thereafter, process 300 may include "provide an expanded and filtered point cloud to be used to generate images" 316. The final point cloud then may be provided first for post-processing to refine the points, which may include traditional space carving, as described below, and then for modeling, display, or analysis as needed depending on the application and as described below as well. By one example, the point cloud allows for accurate 3D applications, such as those that rotate a camera view about the objects in the scene provided by the point cloud to provide a virtual view of the scene.

Referring to FIGS. 4A-4F, process 400 is provided for a method of 3D reconstruction with volume-based filtering for image processing. In the illustrated implementation, process 400 may include one or more operations, functions or actions 402 to 499 generally numbered evenly. By way of non-limiting example, process 400 may be described herein with reference to example image capture processing system 2900 of FIG. 29, and where relevant.

Process 400 may include "obtain image data of multiple images of the same scene from different perspectives" 402, and this may include obtaining images as frames of a video sequence or a series of still photographs. The scene being captured may be a stationary scene or may have moving objects, and the cameras may be held still around a camera dome for example such as with a green screen video or photographic studio where the lighting environment is carefully controlled, or may be fixed around a sports or other event arena, stage, or stadium, also where the lighting conditions are known. The multiple images may be from a single camera moved around a scene or from a camera array as long as the multiple cameras have overlapping images of the same scene. By one example, seventy-six camera perspectives are used in a camera dome, and the cameras are installed at different distances to the target objects. The methods herein provide good quality 3D reconstruction even when multiple cameras or camera perspectives have a relatively wide baseline. Thus, with the present process 400, better quality and better functionality of the computing device can be achieved despite a relatively low overlap and/or large difference in viewing angle resulting from the large baseline and from image to image as described below.

Process 400 may include "perform pre-processing" 404, and pre-processing at least sufficient to perform the point cloud construction when raw image data is received from one or more camera sensors for example. Such pre-processing may include noise reduction, pixel linearization, shading compensation, resolution reduction, Bayer demosaic, vignette elimination, and/or 3A related operations or statistics from automatic white balance (AWB), automatic focus (AF), and/or automatic exposure (AE), and so forth.

Initial Segmentation

To begin constructing a point cloud, 2D image points must be selected that subsequently specify camera rays for triangulating 3D points. This may involve determining image points that identify salient features of objects in the images. Also, since the capturing of scenes by the cameras may capture objects that are not of interest, it is more efficient if these undesired objects are omitted from the analysis to reduce compute time on the 3D reconstruction. A simple way to identify and remove the undesired objects from consideration while beginning to identify feature points in the images, such as corners, edges, or boundaries of the objects, is to provide the reconstruction algorithm with an image mask of foreground objects for each camera.

Thus, process 400 may include "perform initial segmentation of objects in images" 406. Image segmentation, however, remains a seminal problem in computer vision, and even with green screen backgrounds, it can still be difficult to generate accurate foreground masks automatically. Thus, the present process 400 may include a way to combine different segmentation techniques in a highly efficient way providing very accurate segmentation masks with a combination of chroma-keying segmentation, background subtraction, and neural network object detection as follows.

Figure 5:
FIG. 5 is an image demonstrating chroma-key segmentation in accordance with at least one of the implementations disclosed herein.

First, process 400 may include "perform chroma keying-based segmentation" 408, which involves chroma-keying foreground and background colors. This may include "separate background versus foreground colors" 410, "classify regions" 412 which may be performed by constructing a Gaussian Mixture Model to classify regions, and then "label high confidence regions" 414 to assign non-changing labels to regions where a high confidence exists as to being either foreground or background based on the color. See Gupta, L., et al., "A Gaussian-mixture-based image segmentation algorithm", Pattern Recognition, Vol. 31.3, pp. 315-325 (1998); and Matsuyama, T, et al., "Multi-camera systems for 3d video production", 3D Video and Its Applications, pp. 17-44, Springer, London (2012). Referring to FIG. 5, an image 500 shows results of a chroma-key tool for labeling foreground and background regions where the background is all one color such as red while the foreground is formed of other colors.

Figure 6:
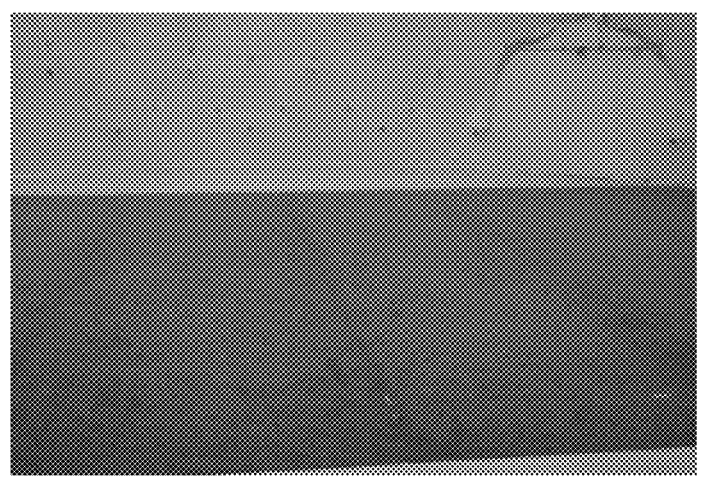
FIG. 6 is an image demonstrating a clean plate capture for background separation in accordance with at least one of the implementations disclosed herein.

Also separately, the initial segmentation may include "perform background subtraction" 416, where a clean plate is shot with the cameras before any live action captures to capture the color of the background. Regions are then labeled 418 as foreground if their color difference (SAD score) from the clean plate exceeds a threshold. Referring to FIG. 6, an image 600 shows a clean plate capture to generate a background before objects are placed into the scene for image capture.

In addition, the initial segmentation may include "perform neural network based segmentation" 420, which uses a convolutional neural network, and by one form a regional CNN (R-CNN) detector to roughly segment humans and other foreground objects. See Girshick, R., et al., Mask R-CNN, "Detectron", Facebook AI Research (FAIR), https://github.com/facebookresearch/detectron, arXiv: 1703.06870v3 (2018).

Figure 7:
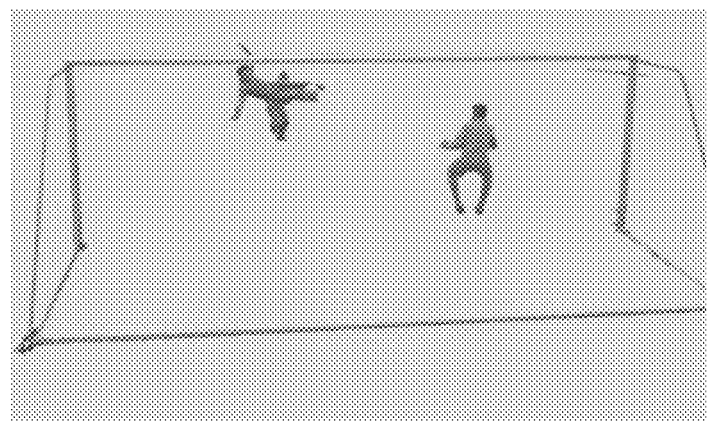
FIG. 7 is an image demonstrating the result of initial object segmentation in accordance with at least one of the implementations disclosed herein.

Process 400 may include "refine segment boundaries" 422, and this may include combining the results of the three methods, such as by unioning the segmentation masks or feeding them into an AdaBoost meta-classifier. The object boundaries are then refined using a boundary algorithm such as active contours or graph cuts. See Rother, C., "Grabcut: Interactive foreground extraction using iterated graph cuts", ACM transactions on graphics (TOG), Vol. 23. No. 3, (2004). The resulting masks may still have segmentation errors, but are still useful for the 3D reconstruction. Referring to FIG. 7, an image 700 shows the combined result of the chroma-keying, background subtraction, neural network object recognition, and boundary refinement.

Select Seeds

Figure 8:
FIG. 8 is an image demonstrating stratified corner sampling in accordance with at least one of the implementations disclosed herein.

Process 400 then proceeds to "determine seed pixels to be used to form an initial point cloud" 424, or at least generate the 2D points that could be used to generate an initial point cloud even when such a point cloud is not actually generated as explained below. This involves identifying high confidence landmarks for region seeding. A stratified random sampling strategy is employed to ensure small structures are not missed. This first may include "construct coarse 2D grid over image" 426 forming a number of grid cells, and "randomly sample pixels in grid cells" 428. Once the sample pixels are selected, the seed selection may include "retain maximal pixels of landmarks in individual cells as seed points" 430. This refers to retaining pixel locations according to a landscape or feature identifying algorithm that generates scores, such with a Shi-Tomasi Eigenvalue-based "corner" score. The process retains the points with such a score that is above a threshold and are maximal among samples within each grid cell. See for example, Shi, J., et al., "Good features to track", Cornell University (1993). In addition or alternatively, a space carving method could be used such as the ones mentioned herein that constructs a visual hull and then uniformly samples a set of points contained within the silhouette of the visual hull when reprojected into individual camera views. The points identified as landscape or feature points are then used as the seeds. Referring to FIG. 8, an image 800 shows stratified corner sampling at the markers where a marker color may indicate estimated scene depth.

Optionally, process 400 may include "use segmentation mask to refine seed points" 432. Thus, if a segmentation mask is available, the system may further restrict these points to those that fall within a certain foreground mask. This may include "determine confidence of segmentation mask" 434. The segmentation mask confidence may be determined by R-CNN segmentation or manually generated by an artist. If there is high confidence in the foreground mask boundaries and contents, process 400 may continue with "restrict to object of interest" 436 as segmented by the segmentation mask when such restriction is desired, such as when only one or less than all objects are of interest, and then may include "remove false positives" 438 thereby removing points that are not on the desired foreground(s). A visual hull may be carved by projecting the foregrounds of the multiple images onto a common 3D space, and once the visual hull is constructed, process 400 may include "project points of visual hull of foreground mask to individual images as seed points" 440. Such visual hull is disclosed by Kutulakos, K. N., et al. cited above. The seed selection may be performed in S iterations 442 and the number of iterations S may be determined by heuristics. As a first pass to the seed selection, the 3D reconstruction can be performed without any segmentation masks, and the segmentation masks may be added in later initial segmentation passes or iterations to provide the restriction of the reconstruction to specific objects of interest or filter out false positives. The result is a map of 2D candidate pixel locations for each image from the multiple cameras or perspectives.

Seeding

Process 400 may include "perform 3D space construction of initial point cloud by seeding 3D space" 444. This operation refers to assigning depth estimates to the 2D candidate pixel locations to form 3D particles that may be used to construct an initial point cloud. Note it is not a requirement that the initial point cloud actually be constructed since it will be re-evaluated in later steps as long as a set of 3D points are available from memory other location to identify which regions space are good places to start looking for objects to be reconstructed.

To perform 3D space reconstruction, process 400 may include "for individual overlapping image pairs, perform stereo-based matching" 446. Thus, this operation may be performed for each overlapping pair of adjacent images. To limit computations, the pairs may be limited by camera position so that only images with camera positions considered to be adjacent are analyzed together, even though one image may overlap a series of other images from an array of cameras. For example image of camera 1 is analyzed with camera 2, image of camera 2 is analyzed with camera 3, and so on, and is limited to this order even though the image of camera 3 may overlap with that of camera 1 as well. By other options, any two images with overlapping field of views with images taken at the same time with similar focal lengths are analyzed.

Figure 10:
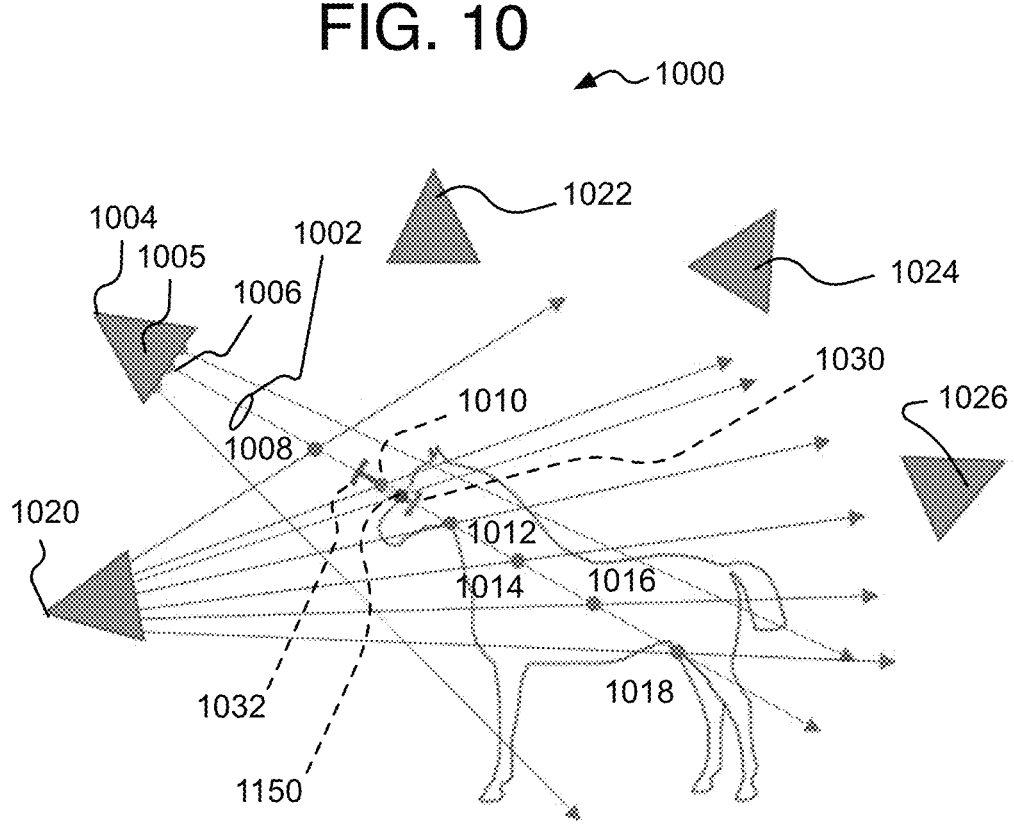
FIG. 10 is a schematic diagram to explain ray-tracing and depth estimations in accordance with at least one of the implementations disclosed herein.

Referring to FIG. 10, process 400 may include "sample points along a ray from a primary center through a seed point of a primary camera and in a view of a secondary camera" 448. Specifically, to determine the correct world positions for the sampled set of 2D pixels, ray-tracing is used, and while referring to camera array 1000, a ray 1002 is traced from each camera center 1004 of a primary camera 1005 and through each sampled pixel (or 2D candidate point) 1006 for that camera 1005 and view. A set of candidate or sampled depth estimates 1008, 1010, 1012, 1014, 1016, and 1018 may be found along the ray 1002 in the view of a secondary camera 1020 and at intersections of rays from the center of the secondary camera 1020. By one form, the depth estimates are uniformly sampled along the ray 1002 and in view of camera 1020 and for a desired number of samples. This is repeated for each camera 1020, 1022, 1024, and 1026 contributing an image of a different perspective.

To find the depth that results in photometric consistency for a particular point, process 400 may include "select highest confidence position along ray to set point depth" 450. This ray-tracing procedure differs significantly than feature matching approaches described in previous works (see Furukawa, Y. et al., and Goesele et al. cited above). The task of achieving high quality photometric consistency is notoriously difficult in the multi-camera wide baseline setting because features observed in a small pixel window can have many similar matches in other views, or may have no correct match in other views because of occlusions, or may not look the same in other views because of the wide baseline. Thus, here, process 400 may include "choose ray position with highest matching DAISY score" 452. A successful metric for matching across wide baseline video is to use DAISY features, which while having some similarity to scale invariant feature transform (SIFT) features employed by existing techniques (see Furukawa, Y., et al., cited above), DAISY has the advantage of being efficient to evaluate densely across an entire image plane, which is desired for the ray-tracing approach herein. See Tola, E. et al., "Daisy: An efficient dense descriptor applied to wide-baseline stereo", IEEE transactions on pattern analysis and machine intelligence, Vol. 32.5, pp. 815-830 (2010); and Lowe, D. G., "Object recognition from local scale-invariant features", Computer vision, The proceedings of the seventh IEEE international conference, Vol. 2. IEEE (1999).

Figure 9:
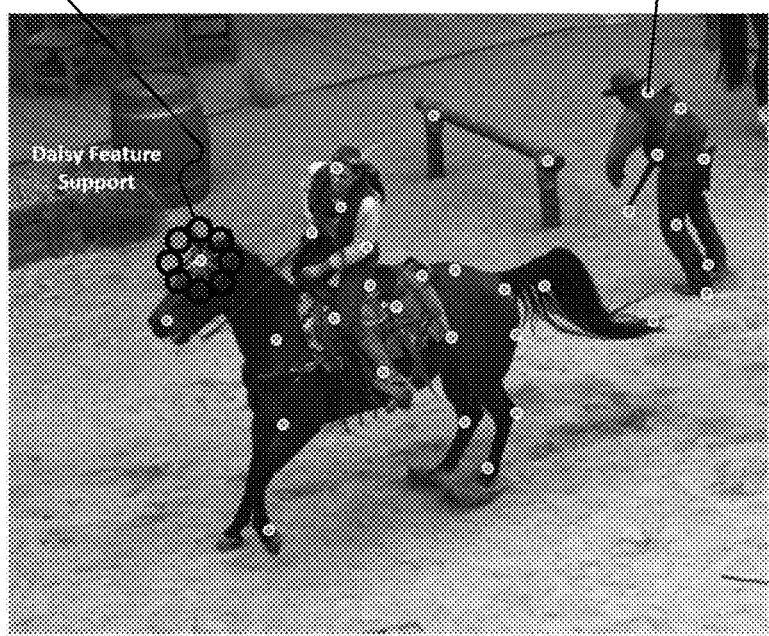
FIG. 9 is an image demonstrating seed locations in accordance with at least one of the implementations disclosed herein.

Referring to FIG. 9, and particularly, DAISY is a gradient histogram-based and Gaussian kernel-based descriptor that bins convolved image data gradient directions and of a number of circular areas positioned radially from a center point so as to form a flower (or daisy)-looking pattern 902 as shown on image 900 that also shows other seed locations 904 as well. Each ring of histograms of the circular areas forms a vector, and these vectors are concatenated to form the values of the descriptor. In a stereo-matching comparison, the descriptor of a pixel of one of the images from camera 1020 may be compared to the descriptor of a potentially corresponding pixel of another image 1005 using their dot product. To state the process another way, for each pair of adjacent views, the ray position along the ray from the primary camera 1005 is chosen that has the highest matching DAISY score in the adjacent camera view 1020.

Figure 11:
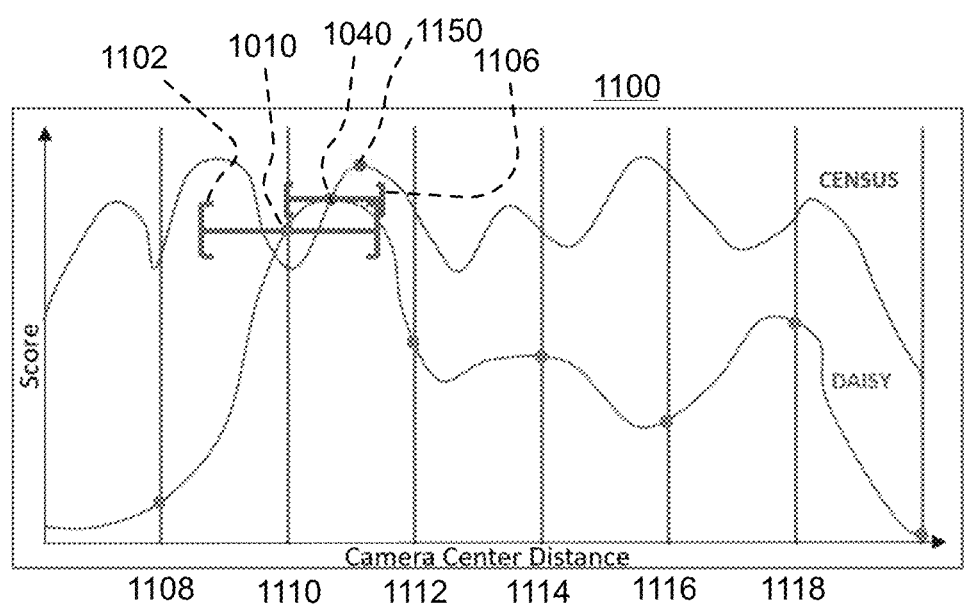
FIG. 11 is a graph of pixel locations to demonstrate depth estimation for seeds in accordance with at least one of the implementations disclosed herein.

Referring to FIGS. 10-11, the search for the highest DAISY score may be represented on a graph 1100 where graph 1100 is a representation of the ray 1002 with distance to camera center along the x-axis and score value on the y-axis. The graph charts a depiction of stereo objective functions for CENSUS and DAISY metrics where the DAISY function is the lower graphed line, while a CENSUS function explained below, is the upper graphed line. The vertical lines 1108, 1110, 1112, 1114, 116, and 1118 represent the uniform spacing (1008 to 1018) and secondary arrays in the view of the secondary camera 1020 on array 1000, and indicate markers for an initial bin search for global optima (or in other words, the bin for the highest DAISY score). The brackets 1102 indicate a local bracket line search for the DAISY optima, and shown as controlling bracket end 1030 on array 1000 as well. The DAISY bracket 1102 is shown here to reach a maximum DAISY score at point 1010 also as shown on array 1000. While DAISY is a good metric for discarding false photo-metric matches, it does not provide good spatial localization when near a true stereo match.

Thus, process 400 also may include "refine ray depth by refinement bracketed line search" 454. The ray depth is then refined through a further bracketed line search in the vicinity of the point 1010. See Press, W. H., et al., "Section 10.2. Golden Section Search in One Dimension", Numerical Recipes: The Art, of Scientific Computing (3rd ed.), New York: Cambridge University Press, ISBN 978-0-521-88068-8, pp. 397-402 (2007).

Thus, process 400 may include "use CENSUS score" 456. To improve localization of landmarks, the highest score of a CENSUS metric using a 7×7 pixel patch with a bracketed line search is performed where the local CENSUS search bracket 1032 and 1106 are respectively shown on FIGS. 10 and 11. CENSUS is another stereo-matching descriptor and refers to a non-parametric intensity-based image data representation over a certain pixel area referred to as a CENSUS transform that summarizes local image structure by providing a bit string (or in other words, transforms image data into a representation). The CENSUS transform represents a set of neighboring pixels within some pixel diameter (such as all adjacent pixels) whose intensity is less than the intensity of a central or other key pixel referred to herein as a pivot pixel. By one example, the bit stream is merely a count of the number of neighbor pixels with an intensity less than the key pixel. Thus, the CENSUS is a characterization, descriptor, or representation of image data for comparison purposes between one image and another image, and the bit stream may be a string of 1s and 0s where 1s indicate a pixel intensity less than the key pixel. Therefore, each pixel on an image can have a CENSUS score that indicates the difference between such a CENSUS of a reference pixel on one image compared to a CENSUS of a corresponding current or candidate pixel on another image. The CENSUS score may be determined by hamming distance between the two bit strings of corresponding pixel location patches on two different images. See Hirschmüller, et al., "Evaluation of stereo matching costs on images with radiometric differences", IEEE Transactions on Pattern Analysis & Machine Intelligence, pp. 1582-1599 (2008); and Zabih, R., et al., "Non-parametric local transforms for computing visual correspondence", European conference on computer vision, Springer, Berlin, Heidelberg, pp. 151-158, (1994)). In the current example, the maximum CENSUS score (or the smallest difference between images) located at point 1040 shown on graph 1100.

It will be understood, however, that the final selected depth estimate is not always the global optima with respect to the CENSUS metrics. In other words, the maximum CENSUS score depth estimate is not always the same as the maximum DAISY score estimate due to differences in the spatial support and metric used by the different features. As shown on graph 1100 and array 1000, an example point 1150 may be the final optima maximum CENSUS score point (or depth estimate), and although within the bracket search of the CENSUS score, the CENSUS score may not be a maximum of the DAISY function. It has been found that the CENSUS score is more accurate closer to the true depth estimate because CENSUS has stronger localization abilities.

Thereafter, process 400 may include "discard occluded points" 458. Specifically, selected points now with depth estimates (or optima) from the ray-tracing still may not be valid if the point was occluded in the adjacent camera. To discard occluded points, the L1 normalization of the color difference (SAD score) between the pixel in the primary and secondary (or adjacent) view is below some threshold.

Also, each camera can have more than one adjacent camera for stereo matching as mentioned above, which can result in having more than one 3D point estimated per pixel location. Although technically only one correct depth can exist for a given pixel, since sometimes insufficient information is provided, duplicate points cannot be ruled out at this phase.

The result is 2D pivot points that are assigned depth estimates, and that may be used to generate an initial point cloud. The 3D version of these points may be referred to as particles when populating the point cloud. Also as mentioned, the initial point cloud may or may not actually be generated depending on the expansion and filtration needs explained below.

Expansion

Turning now to expansion, one strategy for multi-view stereo is to propagate depth estimates from high confidence regions to low confidence regions. By one approach, this is accomplished by performing a local CENSUS score search for points that neighbor a pivot point already assigned a depth estimate and by searching near the depth estimate of the pivot point.

The CENSUS metric may not have any distinct maximum CENSUS scores when using the 7×7 pixel patch in a textureless region. In other words, the pixel spacing may be so fine that the area of a single patch may cover a very small area on an object in an image so that no maximum is reached in that area. To compensate for this difficulty, expansion iterations can be used where some of the iterations use down-sampled images at a lower resolution. In that case, the spatial support for the patch expands, and a distinct maximum CENSUS score is more likely to be observed at the lower resolutions, albeit possibly at the expense of less accuracy in depth.

Figure 12:
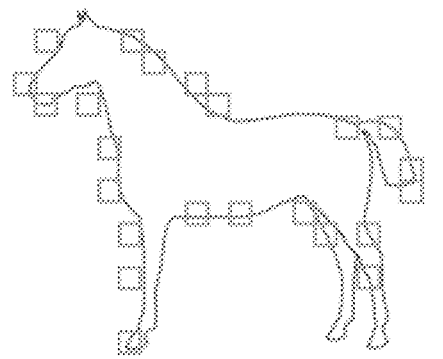
FIG. 12 is a schematic diagram demonstrating initial seed locations in accordance with at least one of the implementations disclosed herein.
Figure 13:
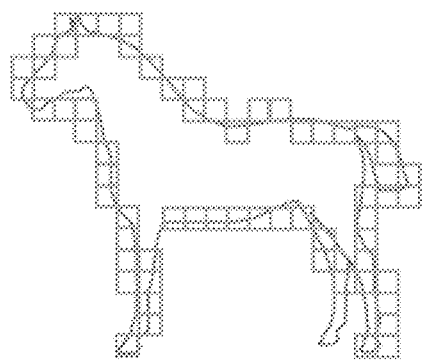
FIG. 13 is a schematic diagram demonstrating seed locations after expansion in accordance with at least one of the implementations disclosed herein.
Figure 14:
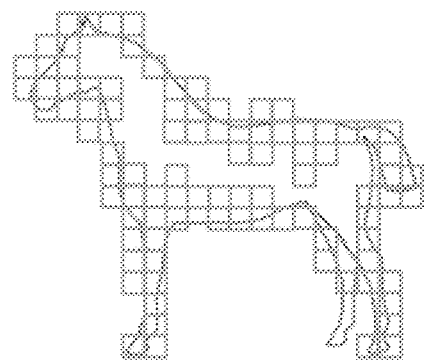
FIG. 14 is a schematic diagram demonstrating seed locations after expansion at a lower resolution in accordance with at least one of the implementations disclosed herein.

Thus, optionally, process 400 may include "predetermine number of resolutions needed to obtain sufficient number of depth points" 460, and this may be determined by experimentation. It also may include what resolutions are to be included, such as down-sampling 2× for each iteration. This also may include "set resolution to finest when multiple resolutions are used" 462. In other words, the system will proceed from fine-to-coarse to capture accurate depth measurements in regions of high frequency textures and complete objects with less accurate depth measurements in regions of low frequency textures. Going from coarse-to-fine is less accurate because the coarser resolutions will ignore regions with fine details, and these regions will continue to be ignored when proceeding to higher resolutions. Referring to FIGS. 12-14 for example, image 1200 shows the relative amount of points used without expansion, image 1300 shows the amount of points used with expansion but without down-sampling, while image 1400 shows the most points when both the expansion iterations are used and used with down-sampled iterations.

Process 400 may include "for each image of different perspective, expand depth estimates to pixel locations" 464, and this may include "set pivot pixel" 466. This includes obtaining the pivot pixel 2D coordinates, depth estimates, and CENSUS scores. A priority queue may be maintained that considers pivot points (or pixels) in order from highest to lowest CENSUS score, or some other logical order.

Process 400 may include "determine if neighbor pixels have depth estimate." 468. For the current pivot pixel at the front of the queue, its four-connected neighbors (left, right, up, down) are checked to see if a depth has been estimated by one example. By other approaches, the diagonally adjacent neighbors may be checked as well, or other neighbor patterns such as within a certain pixel distance of the pivot pixel may be used.

Process 400 may include "use bracketed line search to fill depth estimate" 470. Thus, if the neighbor pixel does not have a depth estimate yet, the depth for the neighbor is determined using a bracketed line search in a small range near the pivot pixel's world position and may include "use CENSUS pixel score" 472 to determine the depth estimate at the maximum CENSUS score for the neighbor pixel (or point). The search is performed on order with the step size used for the original ray-cast. Thus, the CENSUS metric is used here for refining the depth estimates.

Process 400 next may include "discard occluded points" 474, and by using the L1 normalization color difference to discard occluded points as mentioned above for the initial seeding.

The result is an expanded point cloud (or points that can be used to generate an extended point cloud) where the neighbor points become 3D particles, and in turn each an LPV, to be added to the initial point cloud, as described above, and added to form the now expanded latest point cloud. Going forward, the particles are added to the latest expanded point cloud of each expansion iteration.

Filtering

The expansion phase alone, however, can produce a significant amount of false positives. A check on the quality of the expanded point cloud is to form images that render local point volumes (LPVs) forming the point cloud, and then verify that the rendered images are a close match to the original images taken from each view. If the rendered images do not match, the local point volume is removed from the point cloud. While the filtering operation could be performed on initial point clouds formed from many different algorithms or operations, in the present example, however, the filtering is performed after, or as part of, each or individual expansion iteration. By one example, a number of filter iterations may be performed for each expansion iteration.

Thus, the filtering may be begin with having process 400 include "set filter iteration n=0" 476, to start counting filter iterations for the present expansion iteration. The number of filter iterations may be set by experimentation. By one form, the process of rendering and removing points is repeated several times such as in about 8 to 10 filter iterations per expansion iteration.

As to another reason to perform the filtering in iterations, there is no guarantee that removing points will lead to a rendered image that is closer to the original, although empirically this seems to be the case. Culling can produce holes in thin regions of objects where only a single point covers that region of space. It therefore makes sense to alternate between expansion and filtering so that the culled point cloud from a last expansion iteration provides a better initialization for the next expansion iteration.

Referring to FIGS. 15-19, example images are provided and formed by the present iterative expansion-filtering method, and the images show the clear increase in accuracy with the expansion-filtering iterations. An image 1500 shows a scene generated by using initial reconstruction seeds of an initial point cloud. An image 1600 is generated by using an expanded point cloud after a first expansion iteration, while an image 1700 is generated by using a filtered point cloud after a set of first filter iterations for the first expansion iteration. An image 1800 is generated by using an expanded point cloud after a second expansion iteration, while an image 1900, the best quality image so far, is generated by using a filtered point cloud after a set of second filter iterations for the second expansion iteration.

To perform the filtering, process 400 then may include "construct point cloud with local point volumes (LPVs) of predetermined fixed real world size relative to at least one object in the multiple images" 478. The details of this operation are shown on FIG. 4F.

A local point volume (LPV) is a volume unit used for removing points (or particles) from the point cloud, which may be the latest expanded point cloud. The LPV has a fixed shape and volume by one example, and fixed relative to real world dimensions relative to one or more objects in the images. As mentioned, an LPV may be spherical with a diameter of 1 cm for example. In one image, the LPV may show a part of an eye of a face in a crowd and the 1 cm diameter may only extend one pixel, but in a close-up image of the person's face, that 1 cm eye part may extend many pixels, depending on how close the object is to the camera (or the strength of a zoom lens if used) so that the same eye part may extend 5, 10, 100, or whatever pixel length is limited by the camera itself, and therefore, the LPV or sphere will have its 1 cm diameter cover that pixel length of 5, 10, 100, and so on. Spheres are the selected shape due to software rendering efficiency so that their projection onto any camera image is not less than a pixel in width and when rendered in combination with neighboring LPV's, there are no gaps between the points.

The LPVs are advantageous because the LPVs are able to overlap in the point clouds so that when rendered, cracks do not appear between the LPVs. Cracks refer to the uncovered space or gaps between the LPVs. Particularly, the stereo matching procedure uses a fixed pixel size patch such as 7×7 pixels in image space, which is independent of the distance of the center point of the patch to the camera (or independent of the real world object size in an image). The alternative to LPVs would be to splat (or lay flat) the 2D center pixels a patch at a time and with any expanded particles within the patch and in the point cloud. The spacing between points and expanded particles, however, would be much too large in the rendered images (measured in pixels) because of perspective projection and the pixel-limitations of the patches that fix the pivot points (the center of the pixel patches) on object locations. Thus, for example, it doesn't matter how big an object is in the image, the area being used will always only be 7 pixels across for example, which may be way too small to capture a significant number of points in a close-up image with large uncovered areas between points. Note there still could be areas of the image that are uncovered because there may be no LPVs in the vicinity of that region of space, or no depth estimates were provided for pixels in that region of the image (such as a section of the image that was sky and has no computable depth).

Figure 20A:
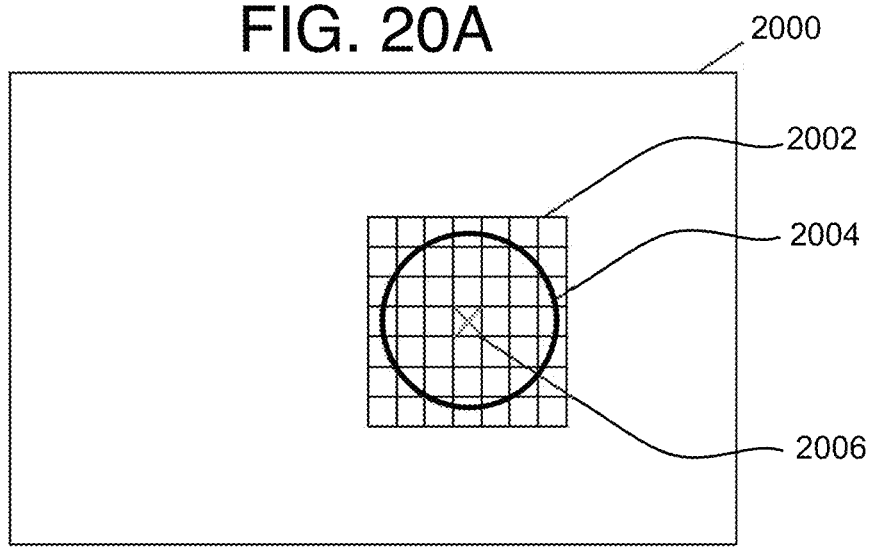
FIG. 20A is a schematic diagram demonstrating a local point volume on an image in accordance with at least one of the implementations disclosed herein.

Referring to FIG. 20A, and to proceed with the filtering, process 400 may include "obtain points with depth estimates" 478-1. By one form, each or individual pivot points (or center pixel) 2006 on a stereo patch 2002 used for the CENSUS score of the pivot point from the ray-casting is shown here on an image 2000. This pivot pixel 2006 provides the 2D location and depth estimate for a center, or other key point, of an LPV 20041. The LPV is positioned along a camera ray emanating from a camera center, passing through the center pixel of a patch, and terminating at the estimated depth distance. The process 400 then may include "set LPVs at the individual pivot points" 478-2, and this will "include neighbor points as LPVs" 478-3 that were added during expansion iterations.

Figure 20B:
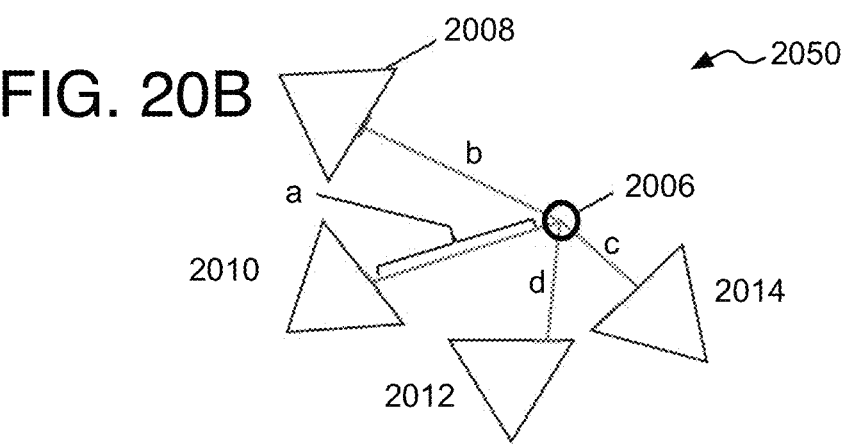
FIG. 20B is a schematic diagram demonstrating differing camera distances to a local point volume in accordance with at least one of the implementations disclosed herein.

Referring to FIG. 20B, the size of the projection of the LPV will vary depending on the position of the LPV in the scene (world location) and which camera is being considered. By one example, a camera array 2050 shows LPV projections 2020. 2022. 2024, and 2026 of different sizes depending on a distance a, b, c, or d to a camera 2008, 2010, 2012, or 2014. To estimate a minimum real world size of the LPV, the center of a camera dome may be approximately 15 meters from each camera and at that distance, a pixel is 1.91 mm in size. The present stereo depth estimator is not pixel accurate, and is about a ⅐ of the image resolution so that accuracy is 7 pixels or about 1.3 cm. Thus, 1 cm spheres as the LPV has sufficient precision to represent the accuracy of the disclosed depth estimation system. 1 pixel would be the minimum projection size for an LPV. Smaller sized spheres may not be observable in the rendered image (i.e. projection smaller than 1 pixel), and larger spheres would throttle the accuracy of the reconstruction system.

Figure 21A:
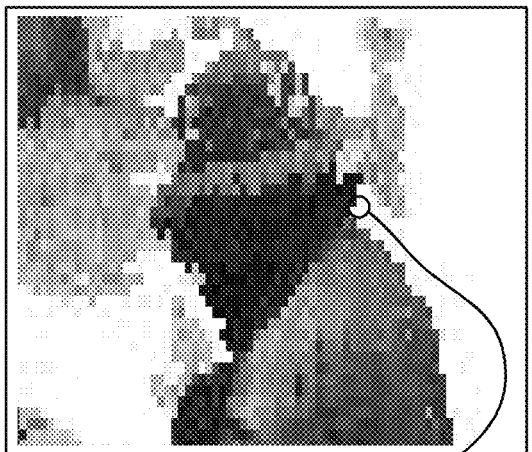
FIG. 21A is an image demonstrating a size of a local point volume on an image in accordance with at least one of the implementations disclosed herein.
Figure 21B:
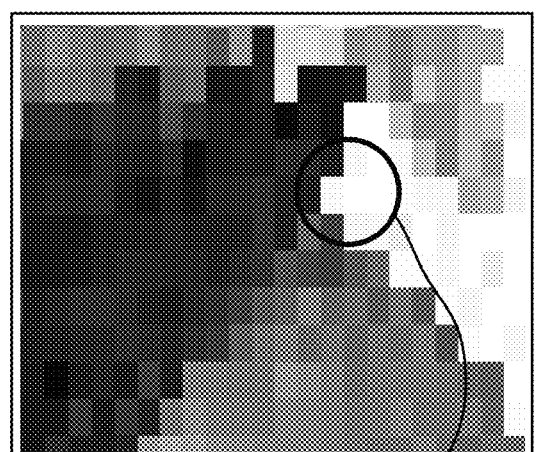
FIG. 21B is a close-up image with a close-up view of the image of FIG. 21A to demonstrate a size of the local point volume on the close-up image in accordance with at least one of the implementations disclosed herein.
Figure 24:
FIG. 24 is a resulting image from a point cloud generated in accordance with at least one of the implementations disclosed herein.

Referring to FIGS. 21A-21B, the effect of the camera distance is demonstrated on a far image 2100 of the cowboy scene in FIGS. 1-2 and 24 for example, and that has an LPV 2102 of 1 cm diameter or width, and targeted to encompass one pixel on image 2100 for example. A closer image 2150 from a different camera now has the same LPV 2102 with 5-10 pixels in diameter as shown. Since the LPV is not locked into a pixel size from image to image, it encompasses a larger size in close-up images that are efficient for filtering using stereo-matching comparisons when colors and/or intensities at a single pixel patch on such close-ups often becomes too ambiguous for a meaningful comparison to image data on another image since there are too many matching areas when the patch is so small. The LPV also can be large enough to overlap other LPVs to avoid cracks as mentioned above.

Process 400 may include "generate point cloud by combining the LPVs" 478-4. Once the LPVs are computed using their 2D point locations and depth estimate, LPVs are aggregated to form a point cloud. Process 400 then may include "measure real world distance in point cloud" 478-5 using a graphics card for example for forward rendering to measure distance. The measured distance from each LPV defining particle can then be used to render the LPV with the other particles within the volume of the LPV as described below.

Process 400 may include "remove LPVs from point cloud that do not match images in two or more views" 480. This may include "compare LPV to corresponding points in 2D images" 482, which in turn, involves "render a visible LPV into a rendered 2D image including any other particles within the volume of the LPV" 482-1. Thus, a current LPV on the latest expanded point cloud and the particles of other LPVs within the volume of the current LPV are projected to rendered a 2D image, one for each camera (or perspective or different view) of the multiple cameras. The real world measurement of the volume, and relative to at least one particle defining the volume of the current LP (which is the center of the sphere in the current example), is used to determine which particles from the latest point cloud are encompassed within the volume of the current LPV for rendering of the rendered 2D image of the LPV by setting the boundaries within the latest point cloud.

This process differs from the filtering process in previous approaches (see Furukawa, Y. et al., and Goesele et al. cited above) in that here, the present method accounts for the size of each local point volume in world space (measured in distance units (mm's or cm's for example) as mentioned above) and may use forward rendering (e.g., OpenGL) to determine visibility. Another advantage of the disclosed approach is that false matches near the camera are easier to detect with forward rendering because the false matches proportionally occupy more pixels in image space.

Particularly, if there is a large color discrepancy at an individual pixel, it can be attributed to the point visible at that location, and the visible point can be removed in the hopes of improving the rendered image by revealing a point hidden behind it. Consider a single pixel location in the rendered image. Only the color for the object that is closest to the camera will be displayed, and all the other deeper objects are hidden behind that visible object. Conceptually, this may refer to a queue of potential color choices for a pixel location based on the visibility order of objects. If the color at the front of the queue is not a good match, the method can remove that color from the queue to reveal the color of the next object in the visibility order. Objects, in this case, are the LPVs or spheres, so this operation removes the LPVs or spheres as a mechanism for removing elements from visibility queues. This check on visibility may be performed using OpenGL or equivalent algorithms for each LPV before the LPV is rendered. Of course the removal of a current local point volume by comparisons explained next also may result in other local point volumes that overlap with the current local point volume becoming visible from a camera perspective.

Process 400 may include "compare the rendered 2D image to a corresponding original 2D image" 482-2, and this operation includes determining the L1 (normalized) color difference (SAD score) between the rendered image and the original image for each perspective or camera. Other options include a different metric for image comparison, such as L2 color difference, normalized correlation, normalize mutual information, etc. . . . .

Process 400 may include "remove LPV with a color SAD score that does not meet a criteria for at least two rendered images" 483, and where the SAD or other score is over a threshold for example for two different perspectives in two original images. It will be understood that other criteria may be used instead or additionally. The removal of the LPV itself refers to the removal of the particle(s) defining the volume of the LPV, and here the defining particle that is the center point of the spherical volume in the present example. By one form, the defining particles of the other LPVs are maintained even though those defining particles are located on the point cloud within the volume of the current LPV being removed and were used to render the current LPV.

One other issue to address is that the algorithm may have reconstructed only one side of an object because the other side was either occluded or there was not enough information to complete the object. To prevent removal of surfaces viewed from their backside, by one form, the method only removes points that face the current rendering camera(s) as determined by the point's normal. Normals are assigned to be the ray direction used for stereo matching.

Returning to FIG. 4D, and thereafter, process 400 may include an inquiry "n=Max N?" 484, to determine whether the last filter iteration was performed, and if not, process 400 may include "set n=n+1" 486, to the count of the next filter iteration, and the process loops back to operation 478 to perform the next filter iteration. If the last filter iteration is reached, process 400 may include an inquiry "lowest resolution complete?" 488. If not, process 400 may include "down-sample images" 490, where the images are down-sampled, and by 2× by one example, and the process loops back to operation 464 to perform the next expansion iteration. By one example, four expansion iterations is found to be sufficient. If the last expansion iteration was performed, the process 400 enters the post-processing phase.

Thus, process 400 may include "perform post-processing" 492, which may include "remove noise clusters" 494. After several iterations of expansion and filtering, noise may remain that could not be removed with the filter technique. Most noise manifests as small, weakly connected clusters of points. These are identified using a nearest-neighbor lookup to first connect neighboring points that are within a specified distance. Small clusters are then removed based on the spatial extent and number of points in the connected component.

Referring to FIGS. 22A-22B, process 400 may include "reduce point cloud density" 496. The point cloud may be severely oversampled in some regions because the expansion phase will add points in overlapping regions. Thus, process 400 may include "generate a visual hull" 497. To reduce the point cloud density, a visual hull is generated (see for visual hall, Kutulakos, K. N., et al. cited above) of the reconstruction using depth maps rendered from the point cloud using traditional space carving, and providing the advantages mentioned above that compensate for the stereo techniques. As shown on diagram 2200, an original (before post-processing) point cloud 2202 has depth maps 2204, 2206, and 2208. The diagram 2250 shows a visual hull with reduced re-sampled points and formed by fusing the depth maps 2204, 2206, 2208. A minimal depth value is assigned to regions where the backside of an object is visible because there is a hole in the front side. This choice of error handling allows the hole to be filled in by the space carving operation instead of punching a hole through the model in a case when the region may be left unfilled.

Process 400 may include "smooth point cloud with shrink wrapping" 498. Starting with the visual hull represented as a mesh, the method may shrink wrap (see Dale, A. M., "Cortical surface-based analysis: I. Segmentation and surface reconstruction", Neuroimage 9.2, pp. 179-194 (1999)) the point cloud by moving mesh vertexes closer to the original point cloud, subject to regularization so that the resultant point cloud is smooth. The topology of the mesh is discarded because triangle quality tends to be poor when vertices are spaced close together.

Process 400 may include "provide access to point cloud for refinement or modeling or display of images" 499. Artists may need to clean up the model as part of the process, which is easier to do in the point cloud setting. Otherwise, the point cloud may be used for further modeling such as for object refinement or for semantic object recognition, and may ultimately be used to form displays of images.

Referring to FIGS. 23A-23B, an image 2300 is provided that shows a scene before post-processing and based on an original point cloud consisting of 2.25M points. The quality is better in an image 2350 based on a final point cloud consisting of 510K points.

The following summaries provide some alternative language to describe the processes mentioned above.

Summary A: Overall Summary:
1 Generate rough foreground/background segmentation masks using a combination of R-CNN, Graph Cuts, and background subtraction.
2 Seed the 3D space by ray-tracing DAISY features in regions labeled as foreground.
3 Starting at finest image resolution, expand seeded regions using CENSUS stereo matching.
4 Render point cloud from each camera view and cull points that are not photo-consistent.
5 Repeat filter process multiple times to peel away inconsistent or weakly supported points.
6 Repeat CENSUS expansion at lower image resolution followed by culling pass.
7 Alternate between expanding and filtering from fine-to-coarse in image resolution.
8 Re-sample the point cloud to minimize storage and remove small point cloud clusters identified as noise.

System Summary B: Iteration Summary
Determine seed pixels using corner detection or space carving.
Ray-trace through seed pixels to find potential 3D points using DAISY features and refined by CENSUS stereo matching.
For 1 to 3 image resolutions:
  For each image:
  Expand point cloud using CENSUS stereo matching.
  For 1 to 8 iterations:
    For each image:
      Render point cloud with fixed size spheres.
      Remove points that do match captured images in two or more views.
      Down-sample images by 2×.
  Detect and remove small point clusters below a threshold.
  Generate a visual hull mesh of the object.
  Shrink wrap the point cloud using the visual hull for initialization.

Referring to FIG. 24, the resulting cowboy scene is provided in an image 2400 generated by using the methods herein although without masking. It is noted how the image preserves thin foreground objects (such as the gun) compared to images 100 (FIG. 1) and 200 (FIG. 2). However, the image still has false positive noise that should be removed manually by an artist or further automatic processes. The buildings in the image are largely discarded in the shrink-wrap phase because there are not enough observations to space carve at the periphery of the camera dome that was used.

Referring to FIGS. 25-26, images 2500 and 2600 result from the present methods but now formed with segmentation masking (chroma-key, background removal, and neural network object recognition). Segmentation masks help the present methods produce sharp boundaries around identifiable objects (e.g. people, trees, and horses) as shown.

Referring to FIGS. 27-28, top-down view images 2700 and 2800, where image 2700 is the result of the present methods before the shrink-wrap phase, and image 2800 is the result of conventional stereo image matching using Agisoft PhotoScan, where it can be seen that image 2700 captures much more detail than the conventional process.

Any one or more of the operations of FIGS. 3 and 4A-4F may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 29:
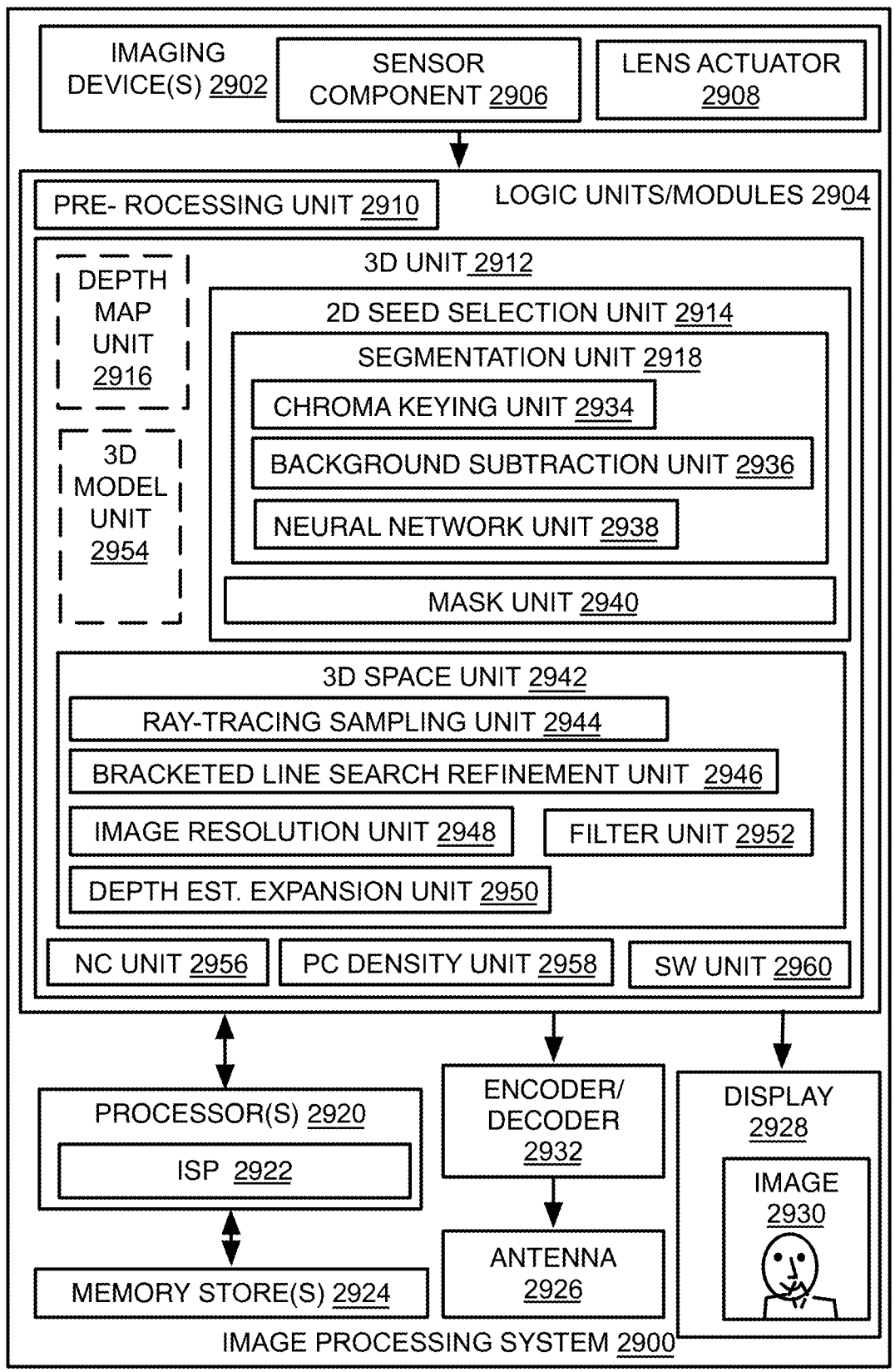
FIG. 29 is an illustrative diagram of an example system.

Referring to FIG. 29, an example image processing system 2900 is arranged in accordance with at least some implementations of the present disclosure. In various implementations, the example image processing system 2900 may have an imaging device 2902 to form or receive captured image data. This can be implemented in various ways. Thus, in one form, the image processing system 2900 may be one or more digital cameras or other image capture devices, and imaging device 2902, in this case, may be the camera hardware and camera sensor software, module, or component 2904. In other examples, imaging processing system 2900 may have an imaging device 2902 that includes or may be one or more cameras, and logic modules 2904 may communicate remotely with, or otherwise may be communicatively coupled to, the imaging device 2902 for further processing of the image data.

Thus, image processing system 2900 may be one of multiple cameras in a camera array, considered the processing camera, or the logic modules 2904 may be kept physically separate from all of the cameras in the camera array, such as at a remote computer or server communicating with the camera array. In the commercial or professional realm, the cameras of the camera array are dedicated digital cameras. Alternatively, image processing device 2900 may be one or more cameras on a multi-use device such as a smartphone, tablet, laptop, or other mobile device, or even a computer or other computing device. Otherwise, system 2900 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that may or may not provide a preview screen, or some combination of these. Thus, in one form, imaging device 2902 may include camera hardware and optics including one or more sensors as well as auto-focus, zoom, aperture, ND-filter, auto-exposure, flash, and actuator controls. These controls may be part of a sensor module or component 2906 for operating the sensor. The sensor component 2906 may be part of the imaging device 2902, or may be part of the logical modules 2904 or both. Such sensor component can be used to generate images for a viewfinder and take still pictures or video. The imaging device 2902 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 2902 may be provided with an eye tracking camera.

The imaging device 2902 also may have a lens actuator 2908 that has a lens and a lens driver or driver logic that receives commands to move the lens and applies an electrical current to move the lens. The imaging device 2902 may have any other relevant component for capturing images consistent with the method and system described herein.

In the illustrated example, the logic modules 2904 may include a pre-processing unit 2910 that receives and modifies raw image data for further processing and as described above. The logic modules 2904 also may include a 3D unit 2912 for reconstruction that, in turn, includes a 2D seed selection unit 2914 and optionally a depth map unit 2916 to provide data for an initial point cloud when needed, or for use for space carving during post-processing as described above. The depth maps could also be used when RGBD cameras are used instead of, or in addition to, RGB cameras. Otherwise, the 3D unit 2912 also may have a 3D space unit 2942 to perform the construction of a point cloud, post-processing units including a noise cluster unit 2956, a point cloud density unit 2958 that may use the depth maps mentioned, and a shrink-wrap unit 2960, all performing tasks mentioned above. The 3D unit 2912 may or may not include a 3D model unit that then uses the point cloud for further analysis and modeling such as for refined segmentation or semantic segmentation and so forth.

The 2D seed selection unit may have a segmentation unit 2918 with a chroma keying unit 2934, a background separation unit 2936, a neural network unit 2938, and a mask unit 2940, while the 3D space unit 2942 has a ray-tracing sampling unit 2944, a bracketed line search refinement unit 2946 (including DAISY and CENSUS operations), an image resolution unit 2948, a depth estimate expansion unit 2950, and a filter unit 2952, where each unit is arranged to perform operations mentioned above with tasks related to the titles of the units here. The logic modules 2904 may or may not be located physically separate from the imaging device, and regardless of any physical separation, the logic modules 2904 still may be considered to be part of the imaging device when performing tasks on data provided by the imaging device. It will also be understood that any of these units may include any code or hardware that is used to perform the tasks suggested by the title of the unit, and may or may not actually be a physically separate object, or separate section of code, from other objects or code that perform other tasks.

The image processing system 2900 may have one or more processors 2920 which may include a dedicated image signal processor (ISP) 2922 such as the Intel Atom, memory stores 2924 which may or may not hold point cloud or other data related to the point cloud construction, one or more displays 2928 to provide images 2930, encoder/decoder 2932, and antenna 2934. In one example implementation, the image processing system 2900 may have the display 2928, at least one processor 2920 communicatively coupled to the display, and at least one memory 2924 communicatively coupled to the processor. The encoder/decoder 2932 and antenna 2934 may be provided to compress the modified image date for transmission to other devices that may further refine the point cloud or use the point cloud to display or store images. It will be understood that the encoder/decoder 2932 may include a decoder to receive and decode image data for processing by the system 2900, including point cloud registration by the 3D unit 2914. Otherwise, the processed image 2930 may be displayed on display 2928 or stored in memory 2924. As illustrated, any of these components may be capable of communication with one another and/or communication with portions of logic modules 2904 and/or imaging device 2902. Thus, processors 2920 may be communicatively coupled to both the image device 2902 and the logic modules 2904 for operating those components. By one approach, although image processing system 2900, as shown in FIG. 29, may include one particular set of blocks or actions associated with particular components or modules, these blocks or actions may be associated with different components or modules than the particular component or module illustrated here.

Figure 30:
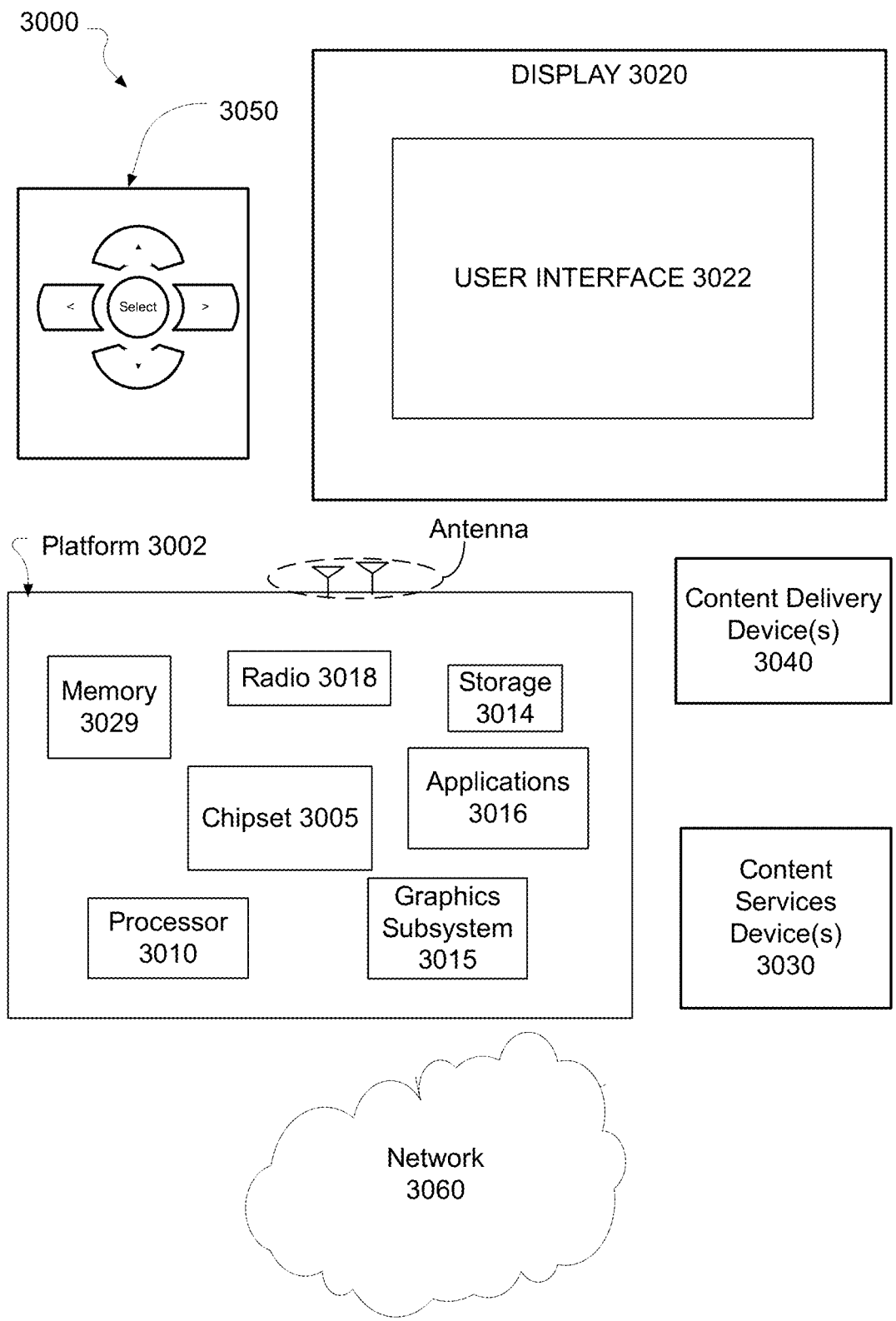
FIG. 30 is an illustrative diagram of another example system.

Referring to FIG. 30, an example system 3000 in accordance with the present disclosure operates one or more aspects of the image processing system described herein. It will be understood from the nature of the system components described below that such components may be associated with, or used to operate, certain part or parts of the image processing system 1800 described above. In various implementations, system 3000 may be a media system although system 3000 is not limited to this context. For example, system 3000 may be incorporated into an array of cameras or a controller for such array of cameras, a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 3000 includes a platform 3002 coupled to a display 3020. Platform 3002 may receive content from a content device such as content services device(s) 3030 or content delivery device(s) 3040 or other similar content sources. A navigation controller 3050 including one or more navigation features may be used to interact with, for example, platform 3002 and/or display 3020. Each of these components is described in greater detail below.

In various implementations, platform 3002 may include any combination of a chipset 3005, processor 3010, memory 3012, storage 3014, graphics subsystem 3015, applications 3016 and/or radio 3018. Chipset 3005 may provide intercommunication among processor 3010, memory 3012, storage 3014, graphics subsystem 3015, applications 3016 and/or radio 3018. For example, chipset 3005 may include a storage adapter (not depicted) capable of providing intercommunication with storage 3014.

Processor 3010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 3010 may be dual-core processor(s), dual-core mobile processor(s), and so forth.

Memory 3012 may be implemented as a volatile memory device such as, but not limited to, a Random Access Memory (RAM), Dynamic Random Access Memory (DRAM), or Static RAM (SRAM).

Storage 3014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 3014 may include technology to increase the storage performance enhanced protection for valuable digital media when multiple hard drives are included, for example.

Graphics subsystem 3015 may perform processing of images such as still or video for display. Graphics subsystem 3015 may be a graphics processing unit (GPU) or a visual processing unit (VPU), for example. An analog or digital interface may be used to communicatively couple graphics subsystem 3015 and display 3020. For example, the interface may be any of a High-Definition Multimedia Interface, Display Port, wireless HDMI, and/or wireless HD compliant techniques. Graphics subsystem 3015 may be integrated into processor 3010 or chipset 3005. In some implementations, graphics subsystem 3015 may be a stand-alone card communicatively coupled to chipset 3005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 3018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 3018 may operate in accordance with one or more applicable standards in any version.

In various implementations, display 3020 may include any television type monitor or display. Display 3020 may include, for example, a computer display screen, touch screen display, video monitor, television-like device, and/or a television. Display 3020 may be digital and/or analog. In various implementations, display 3020 may be a holographic display. Also, display 3020 may be a transparent surface that may receive a visual projection. Such projections may convey various forms of information, images, and/or objects. For example, such projections may be a visual overlay for a mobile augmented reality (MAR) application. Under the control of one or more software applications 3016, platform 3002 may display user interface 3022 on display 3020.

In various implementations, content services device(s) 3030 may be hosted by any national, international and/or independent service and thus accessible to platform 3002 via the Internet, for example. Content services device(s) 3030 may be coupled to platform 3002 and/or to display 3020. Platform 3002 and/or content services device(s) 3030 may be coupled to a network 3060 to communicate (e.g., send and/or receive) media information to and from network 3060. Content delivery device(s) 3040 also may be coupled to platform 3002 and/or to display 3020.

In various implementations, content services device(s) 3030 may include a cable television box, personal computer, network, telephone, Internet enabled devices or appliance capable of delivering digital information and/or content, and any other similar device capable of unidirectionally or bidirectionally communicating content between content providers and platform 3002 and/display 3020, via network 3060 or directly. It will be appreciated that the content may be communicated unidirectionally and/or bidirectionally to and from any one of the components in system 3000 and a content provider via network 3060. Examples of content may include any media information including, for example, video, music, medical and gaming information, and so forth.

Content services device(s) 3030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 3002 may receive control signals from navigation controller 3050 having one or more navigation features. The navigation features of controller 3050 may be used to interact with user interface 3022, for example. In implementations, navigation controller 3050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 3050 may be replicated on a display (e.g., display 3020) by movements of a pointer, cursor, focus ring, or other visual indicators displayed on the display. For example, under the control of software applications 3016, the navigation features located on navigation controller 3050 may be mapped to virtual navigation features displayed on user interface 3022, for example. In implementations, controller 3050 may not be a separate component but may be integrated into platform 3002 and/or display 3020. The present disclosure, however, is not limited to the elements or in the context shown or described herein.

In various implementations, drivers (not shown) may include technology to enable users to instantly turn on and off platform 3002 like a television with the touch of a button after initial boot-up, when enabled, for example. Program logic may allow platform 3002 to stream content to media adaptors or other content services device(s) 3030 or content delivery device(s) 3040 even when the platform is turned "off." In addition, chipset 3005 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 3000 may be integrated. For example, platform 3002 and content services device(s) 3030 may be integrated, or platform 3002 and content delivery device(s) 3040 may be integrated, or platform 3002, content services device(s) 3030, and content delivery device(s) 3040 may be integrated, for example. In various implementations, platform 3002 and display 3020 may be an integrated unit. Display 3020 and content service device(s) 3030 may be integrated, or display 3020 and content delivery device(s) 3040 may be integrated, for example. These examples are not meant to limit the present disclosure.

In various implementations, system 3000 may be implemented as a wireless system, a wired system, or a combination of both. When implemented as a wireless system, system 3000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 3002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 30.

Figure 31:
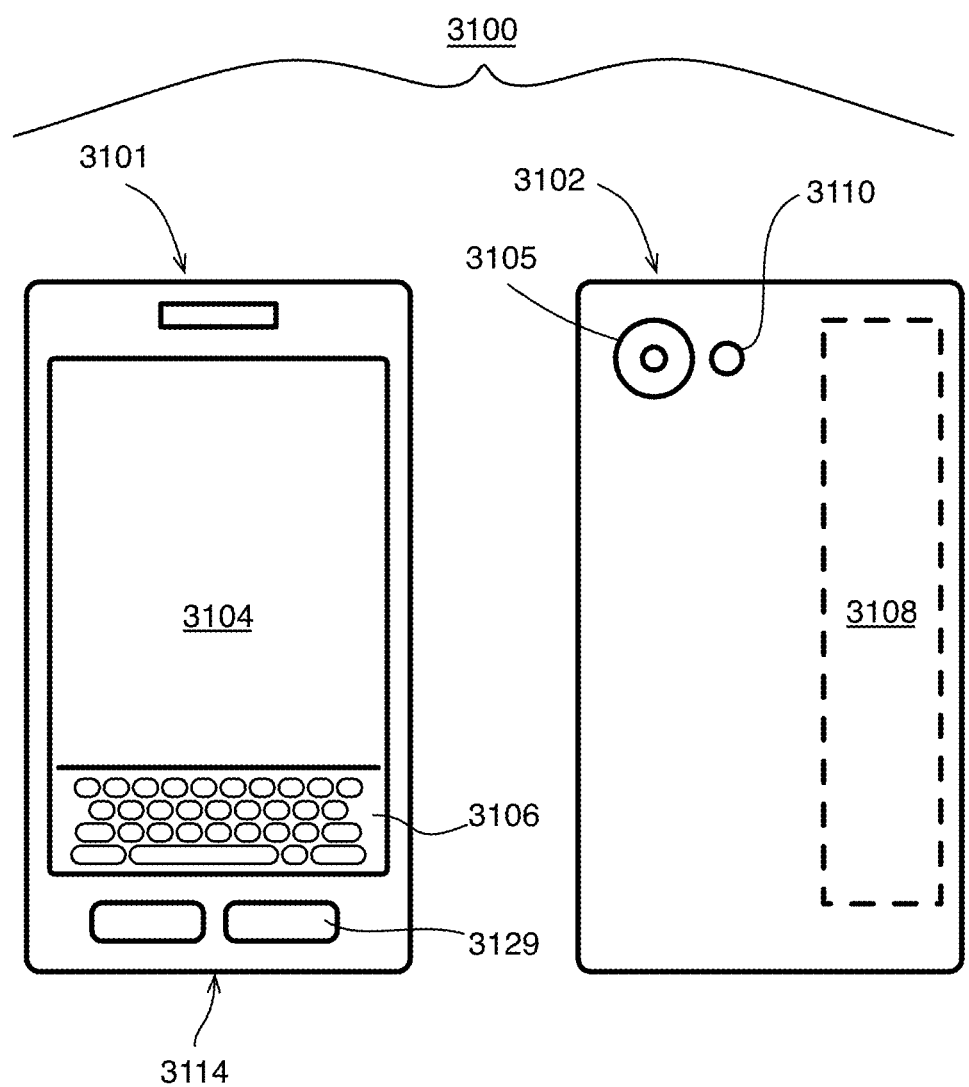
FIG. 31 illustrates another example device, all arranged in accordance with at least some implementations of the present disclosure.

Referring to FIG. 31, a small form factor device 3100 is one example of the varying physical styles or form factors in which systems 2900 or 3000 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include an array of cameras, a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 31, device 3100 may include a housing with a front 3101 and a back 3102. Device 3100 includes a display 3104, an input/output (I/O) device 3106, and an integrated antenna 3108. Device 3100 also may include navigation features 3112. I/O device 3106 may include any suitable I/O device for entering information into a mobile computing device. Examples for I/O device 3106 may include an alphanumeric keyboard, a numeric keypad, a touch pad, input keys, buttons, switches, microphones, speakers, voice recognition device and software, and so forth. Information also may be entered into device 3100 by way of microphone 3114, or may be digitized by a voice recognition device. As shown, device 3100 may include a camera 3105 (e.g., including at least one lens, aperture, and imaging sensor) and a flash 3110 integrated into back 3102 (or elsewhere) of device 3100. The device may be one of an array of such devices to provide an array of cameras, or may be a controller for an array of cameras. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of point generation for image processing comprises obtaining image data from at least one camera and of multiple images of different perspectives of the same scene; forming a point cloud using the image data of the multiple images; filtering, by at least one processor, local point volumes comprising removing the local point volumes, volume by volume, from the point cloud that do not have matching image data on at least two of the multiple images, wherein individual local point volumes are formed of at least one particle on the point cloud defining a volume having fixed real world dimensions relative to at least one object in the multiple images and that remains fixed from image to image of different perspectives; and providing an expanded and filtered point cloud to be used to generate images.

By another implementation, the method may include obtaining 2D points assigned depth estimates; assigning a local point volume each to individual points with an assigned depth estimate; and constructing the point cloud by combining the local point volumes, wherein the 2D points are center points of CENSUS score patches used to determine the depth estimate of the 2D point. The method may comprise rendering of an individual local point volume at the point cloud and including 3D particles positioned within the individual local point volume and defining other local point volumes, and rendered into a rendered 2D image; comparing the rendered 2D image to individual images of the multiple images to determine whether or not the local point volume should be removed; and removing the local point volume when a difference between image data values of the rendered 2D image and at least two of the multiple images meet a criteria, wherein removal of a current local point volume comprises removing the at least one particle on the point cloud defining the volume, wherein removal of the current local point volume does not remove the defining particles of any other local point volume, wherein the removal of the current local point volume causes other local point volume(s) that overlap with the current local point volume to become visible from a camera perspective, wherein the shape of the local point volumes are spheres, and the at least one particle on the point cloud defining the volume is the center point of the sphere, wherein the size of the local point volumes is set depending on one or more distances of the cameras to the scene being captured, wherein the local point volumes each have a largest outer diameter or width that is one of: about 1 mm to 2 cm, and at least about 1 mm, wherein the point cloud is an expanded point cloud, and the method comprising forming the expanded point cloud comprising performing expansion iterations each comprising using at least one depth estimate of a point on an initial point cloud to determine a depth estimate of one or more points of at least one of the images, and wherein the filtering is performed after expansion at each expansion iteration.

By a further implementation, a non-transitory computer-implemented system of point cloud generation for image processing, comprises a display; memory communicatively coupled to the display; and at least one processor communicatively coupled to the display and the memory, and the at least one processor arranged to be operated by: obtaining image data from at least one camera and of multiple images of different perspectives of the same scene; forming an initial point cloud using the image data of the multiple images; forming an expanded point cloud comprising performing expansion iterations each comprising using at least one depth estimate of a point on the initial point cloud to determine a depth estimate of one or more other points of at least one of the images; filtering local point volumes comprising removing the local point volumes, volume by volume, from the expanded point cloud that do not have matching image data on at least two of the multiple images after expansion of the individual expansion iterations, wherein individual local point volumes are formed of at least one particle on the expanded point cloud defining a volume having fixed real world dimensions relative to at least one object in the multiple images and that remains fixed from image to image of different perspectives; and providing an expanded and filtered point cloud to be used to generate images.

As another implementation, the system may have the processor(s) operate so that wherein individual expansion iterations are performed at different resolutions of the same images, wherein the at least one processor being arranged to be operated by performing the expansion iterations from finest resolution to lowest resolution, wherein the at least one processor being arranged to be operated by using a confidence value to determine the depth estimate to expand to the one or more points of at least one of the images, wherein the at least one processor being arranged to be operated by using a bracketed line search to determine a depth estimate with a highest confidence score to assign to at least one neighbor pixel location of the point of the initial point cloud, wherein the confidence score is a CENSUS score, wherein the at least one processor being arranged to be operated by performing the filtering as multiple filter iterations after expansion at an individual expansion iteration, wherein the size of the local point volume is fixed at about 1 mm to 2 cm diameter spheres, wherein the removal of the local point volume comprises the at least one particle on the expanded point cloud defining the volume.

By another form, a non-transitory computer-readable medium having stored thereon instructions that when executed cause a computing device to operate by obtaining image data from at least one camera and of multiple images of different perspectives of the same scene; forming an initial point cloud using the image data of the multiple images; forming an expanded point cloud comprising performing expansion iterations each comprising using at least one depth estimate of a point on the initial point cloud to determine a depth estimate of one or more other points of at least one of the images; filtering local point volumes comprising removing the local point volumes, volume by volume, from the expanded point cloud that do not have matching image data on at least two of the multiple images after expansion of the individual expansion iterations, wherein individual local point volumes are formed of at least one particle on the expanded point cloud defining a volume having fixed real world dimensions relative to at least one object in the multiple images and that remains fixed from image to image of different perspectives; and providing an expanded and filtered point cloud to be used to generate images.

As another option, the instructions execute the computing device to operate by initially segmenting objects on the images comprising performing a chroma-keyed based segmentation, subtracting background from chroma-key segmentation results, and performing a neural network-based segmentation on the image data, and combining the results of the chroma-keyed based segmentation, background subtraction, and the neural network-based segmentation; initially segmenting objects on the images; ray-tracing to determine a range of candidate depth estimates along a ray from one camera and pixel point to a view of another camera; selecting, among the range, an initial depth estimate by using a gradient histogram-based and Guassian-based descriptor and refining the depth estimate by using a non-parametric image data patch-based descriptor; and assigning a local point volume to the individual points with the assigned depth estimates.

By one example implementation, another computer-implemented method of point cloud generation for image processing comprises obtaining image data from at least one camera and of multiple images of different perspectives of the same scene; forming a point cloud formed of 3D particles of local point volumes, wherein each individual local point volume is formed of at least one particle on the point cloud defining a volume having fixed real world dimensions relative to at least one object in the multiple images and that remains fixed from image to image of different perspectives; filtering, by at least one processor, the local point volumes comprising: rendering a 2D image of individual local point volumes in the point cloud, volume by volume, by using the at least one particle defining a current local point volume and particles within the current local point volume that define other local point volumes on the point cloud, and removing the local point volumes, volume by volume, from the point cloud that do not have a rendered 2D image with matching image data on at least two of the multiple images and comprising removing the at least one particle defining the local point volume without a match; and providing a filtered point cloud to be used to generate images.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of point cloud generation for image processing comprising:
    obtaining image data from at least one camera and of multiple images of different perspectives of the same scene;
    forming a point cloud using the image data of the multiple images;
    filtering, by at least one processor, local point volumes comprising removing the local point volumes, volume by volume, from the point cloud that do not have matching image data on at least two of the multiple images,
    wherein individual local point volumes are formed of at least one particle on the point cloud defining a volume having fixed real world dimensions for the local point volume relative to at least one object in the multiple images, wherein the local point volume maintains the fixed real world dimensions from image to image of different perspectives so that the number of particles within the local point volume does not change from image to image while the number of pixels within the local point volume changes from image to image; and providing an expanded and filtered point cloud to be used to generate images.

2. The method of claim 1 comprising:
obtaining 2D points assigned depth estimates;
assigning a local point volume each to individual points with an assigned depth estimate; and
constructing the point cloud by combining the local point volumes.

3. The method of claim 2 wherein the 2D points are center points of CENSUS score patches used to determine the depth estimate of the 2D point.

4. The method of claim 1 comprising:
rendering of an individual local point volume at the point cloud and including 3D particles positioned within the individual local point volume and defining other local point volumes, and rendered into a rendered 2D image; and
comparing the rendered 2D image to individual images of the multiple images to determine whether or not the local point volume should be removed.

5. The method of claim 4 comprising removing the local point volume when a difference between image data values of the rendered 2D image and at least two of the multiple images meet a criteria.

6. The method of claim 1 wherein removal of a current local point volume comprises removing the at least one particle on the point cloud defining the volume.

7. The method of claim 6 wherein removal of the current local point volume does not remove the defining particles of any other local point volume.

8. The method of claim 1 wherein the removal of the current local point volume causes other local point volume(s) that overlap with the current local point volume to become visible from a camera perspective.

9. The method of claim 1 wherein the shape of the local point volumes are spheres, and the at least one particle on the point cloud defining the volume is the center point of the sphere.

10. The method of claim 1 wherein the size of the local point volumes is set depending on one or more distances of the cameras to the scene being captured.

11. The method of claim 1 wherein the local point volumes each have a largest outer diameter or width that is one of: about 1 mm to 2 cm, and at least about 1 mm.

12. The method of claim 1 wherein the point cloud is an expanded point cloud, and the method comprising forming the expanded point cloud comprising performing expansion iterations each comprising using at least one depth estimate of a point on an initial point cloud to determine a depth estimate of one or more points of at least one of the images, and wherein the filtering is performed after expansion at each expansion iteration.

13. A computer-implemented system of point cloud generation for image processing, comprising:
a display;
memory communicatively coupled to the display; and
at least one processor communicatively coupled to the display and the memory, and the at least one processor arranged to be operated by:
obtaining image data from at least one camera and of multiple images of different perspectives of the same scene;
forming an initial point cloud using the image data of the multiple images;
forming an expanded point cloud comprising performing expansion iterations each comprising using at least one depth estimate of a point on the initial point cloud to determine a depth estimate of one or more other points of at least one of the images;
filtering local point volumes comprising removing the local point volumes, volume by volume, from the expanded point cloud that do not have matching image data on at least two of the multiple images after expansion of the individual expansion iterations,
wherein individual local point volumes are formed of at least one particle on the expanded point cloud defining a volume having fixed real world dimensions for the local point volume relative to at least one object in the multiple images, wherein the local point volume maintains the fixed real world dimensions from image to image of different perspectives so that the number of particles within the local point volume does not change from image to image while the number of pixels within the local point volume changes from image to image; and
providing an expanded and filtered point cloud to be used to generate images.

14. The system of claim 13 wherein individual expansion iterations are performed at different resolutions of the same images.

15. The system of claim 14 wherein the at least one processor being arranged to be operated by performing the expansion iterations from finest resolution to lowest resolution.

16. The system of claim 13 wherein the at least one processor being arranged to be operated by using a confidence value to determine the depth estimate to expand to the one or more points of at least one of the images.

17. The system of claim 16 wherein the at least one processor being arranged to be operated by using a bracketed line search to determine a depth estimate with a highest confidence score to assign to at least one neighbor pixel location of the point of the initial point cloud.

18. The system of claim 17 wherein the confidence score is a CENSUS score.

19. The system of claim 13 wherein the at least one processor being arranged to be operated by performing the filtering as multiple filter iterations after expansion at an individual expansion iteration.

20. The system of claim 13 wherein the size of the local point volume is fixed at about 1 mm to 2 cm diameter spheres.

21. The system of claim 13 wherein the removal of the local point volume comprises the at least one particle on the expanded point cloud defining the volume.

22. A non-transitory computer-readable medium having stored thereon instructions that when executed cause a computing device to operate by:
obtaining image data from at least one camera and of multiple images of different perspectives of the same scene;
forming an initial point cloud using the image data of the multiple images;
forming an expanded point cloud comprising performing expansion iterations each comprising using at least one depth estimate of a point on the initial point cloud to determine a depth estimate of one or more other points of at least one of the images;
filtering local point volumes comprising removing the local point volumes, volume by volume, from the expanded point cloud that do not have matching image data on at least two of the multiple images after expansion of the individual expansion iterations, wherein individual local point volumes are formed of at least one particle on the expanded point cloud defining a volume having fixed real world dimensions relative to at least one object in the multiple images, wherein the local point volume maintains the fixed real world dimensions from image to image of different perspectives so that the number of particles within the local point volume does not change from image to image while the number of pixels within the local point volume changes from image to image; and providing an expanded and filtered point cloud to be used to generate images.

23. The computer-readable medium of claim 22 wherein the instructions cause the computing device to operate by initially segmenting objects on the images comprising performing a chroma-keyed based segmentation, subtracting background from chroma-key segmentation results, and performing a neural network-based segmentation on the image data, and combining the results of the chroma-keyed based segmentation, background subtraction, and the neural network-based segmentation.

24. The computer-readable medium of claim 22 wherein the instructions cause the computing device to operate by:
   initially segmenting objects on the images;
   ray-tracing to determine a range of candidate depth estimates along a ray from one camera and pixel point to a view of another camera;
   selecting, among the range, an initial depth estimate by using a gradient histogram-based and Guassian-based descriptor and refining the depth estimate by using a non-parametric image data patch-based descriptor; and
   assigning a local point volume to the individual points with the assigned depth estimates.

25. A computer-implemented method of point cloud generation for image processing comprising:
   obtaining image data from at least one camera and of multiple images of different perspectives of the same scene;
   forming a point cloud formed of 3D particles of local point volumes, wherein each individual local point volume is formed of at least one particle on the point cloud defining a volume having fixed real world dimensions relative to at least one object in the multiple images and that remains fixed from image to image of different perspectives;
   filtering, by at least one processor, the local point volumes comprising:
      rendering a 2D image of individual local point volumes in the point cloud, volume by volume, by using the at least one particle defining a current local point volume and particles within the current local point volume that define other local point volumes on the point cloud, and
      removing the local point volumes, volume by volume, from the point cloud that do not have a rendered 2D image with matching image data on at least two of the multiple images and comprising removing the at least one particle defining the local point volume without a match; and
   providing a filtered point cloud to be used to generate images.

* * * * *